(12) United States Patent
Stuart et al.

(10) Patent No.: US 10,499,269 B2
(45) Date of Patent: Dec. 3, 2019

(54) SYSTEMS AND METHODS FOR ASSIGNING CONTROLLED NODES TO CHANNEL INTERFACES OF A CONTROLLER

(71) Applicant: CommScope Technologies LLC, Hickory, NC (US)

(72) Inventors: Steven B. Stuart, Eden Prairie, MN (US); Thomas Stavsvick, Savage, MN (US); Dean Zavadsky, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 112 days.

(21) Appl. No.: 15/348,845

(22) Filed: Nov. 10, 2016

(65) Prior Publication Data

US 2017/0142607 A1     May 18, 2017

Related U.S. Application Data

(60) Provisional application No. 62/254,470, filed on Nov. 12, 2015.

(51) Int. Cl.
*H04W 24/10*     (2009.01)
*H04W 24/02*     (2009.01)
(Continued)

(52) U.S. Cl.
CPC .......... *H04W 24/10* (2013.01); *H04W 24/02* (2013.01); *H04W 48/16* (2013.01); *H04W 92/22* (2013.01)

(58) Field of Classification Search
CPC ..... H04W 24/02; H04W 24/10; H04W 48/16; H04W 88/085
See application file for complete search history.

(56) References Cited

U.S. PATENT DOCUMENTS 3,931,473 A   1/1976 Ferris, Jr.
4,101,834 A   7/1978 Stutt et al.
(Continued)

FOREIGN PATENT DOCUMENTS

CA   2058736   7/1993
CA   2058737   7/1993
(Continued)

OTHER PUBLICATIONS

Lee et al., "Intelligent Microcell Applications in PCS", "Vehicular Technology Conference, 1993., 43rd IEEE", May 20, 1993, pp. 721-727, Publisher: IEEE.
(Continued)

*Primary Examiner* — Min Jung
(74) *Attorney, Agent, or Firm* — Fogg & Powers LLC

(57) ABSTRACT

Controller provides signals to controlled nodes and includes first channel interface coupled to first controlled node and second channel interface coupled to second controlled node. Controller discovers which channel interface is coupled to which controlled node by communicating first measurement request signal from first channel interface toward first controlled node; communicating second measurement request signal from second channel interface toward second controlled node; communicating power level request signal from a channel interface to first/second controlled nodes; receiving set of power levels from both first/second controlled nodes in response to power level request signal; determining that first controlled node is more strongly signal-coupled with first channel interface than second controlled node when first power level received from first controlled node is higher; and determine that second controlled node is more strongly signal-coupled with first channel interface than first controlled node when first power level received from second controlled node is higher.

31 Claims, 4 Drawing Sheets

(51) Int. Cl.
*H04W 48/16* (2009.01)
*H04W 92/22* (2009.01)

(56) References Cited

U.S. PATENT DOCUMENTS

| | | |
|---|---|---|
| 4,112,488 A | 9/1978 | Smith, III |
| 4,144,409 A | 3/1979 | Utano et al. |
| 4,144,411 A | 3/1979 | Frenkiel |
| 4,183,054 A | 1/1980 | Patisaul et al. |
| 4,231,116 A | 10/1980 | Sekiguchi et al. |
| 4,244,046 A | 1/1981 | Brouard et al. |
| 4,354,167 A | 10/1982 | Terreault et al. |
| 4,402,076 A | 8/1983 | Krajewski |
| 4,451,699 A | 5/1984 | Gruenberg |
| 4,451,916 A | 5/1984 | Casper et al. |
| 4,456,793 A | 6/1984 | Baker et al. |
| 4,475,010 A | 10/1984 | Huensch et al. |
| 4,485,486 A | 11/1984 | Webb et al. |
| 4,525,861 A | 6/1985 | Freeburg |
| 4,531,239 A | 7/1985 | Usui |
| 4,556,760 A | 12/1985 | Goldman |
| 4,596,051 A | 6/1986 | Feldman |
| 4,611,323 A | 9/1986 | Hessenmuller |
| 4,613,990 A | 9/1986 | Halpern |
| 4,628,501 A | 12/1986 | Loscoe |
| 4,654,843 A | 3/1987 | Roza et al. |
| 4,667,319 A | 5/1987 | Chum |
| 4,669,107 A | 5/1987 | Eriksson-Lennartsson |
| 4,691,292 A | 9/1987 | Rothweiler |
| 4,701,909 A | 10/1987 | Kavehrad et al. |
| 4,704,733 A | 11/1987 | Kawano |
| 4,718,004 A | 1/1988 | Dalal |
| 4,726,644 A | 2/1988 | Mathis |
| 4,754,451 A | 6/1988 | Eng et al. |
| 4,755,795 A | 7/1988 | Page |
| 4,759,000 A | 7/1988 | Reitz |
| 4,759,051 A | 7/1988 | Han |
| 4,759,057 A | 7/1988 | Luca et al. |
| 4,760,573 A | 7/1988 | Calvignac et al. |
| 4,790,000 A | 12/1988 | Kinoshita |
| 4,794,649 A | 12/1988 | Fujiwara |
| 4,797,947 A | 1/1989 | Labedz |
| 4,816,825 A | 3/1989 | Chan et al. |
| 4,831,662 A | 5/1989 | Kuhn |
| 4,849,963 A | 7/1989 | Kawano et al. |
| 4,868,862 A | 9/1989 | Ryoichi et al. |
| 4,881,082 A | 11/1989 | Graziano |
| 4,916,460 A | 4/1990 | Powell |
| 4,920,533 A | 4/1990 | Dufresne et al. |
| 4,932,049 A | 6/1990 | Lee |
| 4,959,829 A | 9/1990 | Griesing |
| 4,977,593 A | 12/1990 | Ballance |
| 4,999,831 A | 3/1991 | Grace |
| 5,067,147 A | 11/1991 | Lee |
| 5,067,173 A | 11/1991 | Gordon et al. |
| 5,084,869 A | 1/1992 | Russell |
| 5,134,709 A | 7/1992 | Bi et al. |
| 5,136,410 A | 8/1992 | Heiling et al. |
| 5,138,440 A | 8/1992 | Radice |
| 5,159,479 A | 10/1992 | Takagi |
| 5,175,867 A | 12/1992 | Wejke et al. |
| 5,193,109 A | 3/1993 | Lee |
| 5,243,598 A | 9/1993 | Lee |
| 5,251,053 A | 10/1993 | Heidemann |
| 5,267,261 A | 11/1993 | Blakeney, II et al. |
| 5,272,700 A | 12/1993 | Hansen et al. |
| 5,278,690 A | 1/1994 | Vella-Coleiro |
| 5,280,472 A | 1/1994 | Gilhousen et al. |
| 5,285,469 A | 2/1994 | Vanderpool |
| 5,297,193 A | 3/1994 | Bouix et al. |
| 5,299,198 A | 3/1994 | Kay et al. |
| 5,301,056 A | 4/1994 | O'Neill |
| 5,303,287 A | 4/1994 | Laborde |
| 5,303,289 A | 4/1994 | Quinn |
| 5,305,308 A | 4/1994 | English et al. |
| 5,309,474 A | 5/1994 | Gilhousen et al. |
| 5,313,461 A | 5/1994 | Ahl et al. |
| 5,321,736 A | 6/1994 | Beasley |
| 5,321,849 A | 6/1994 | Lemson |
| 5,339,184 A | 8/1994 | Tang |
| 5,377,255 A | 12/1994 | Beasley |
| 5,381,459 A | 1/1995 | Lappington |
| 5,392,453 A | 2/1995 | Gudmundson et al. |
| 5,400,391 A | 3/1995 | Emura et al. |
| 5,442,681 A | 8/1995 | Kotzin et al. |
| 5,442,700 A | 8/1995 | Snell et al. |
| 5,457,557 A | 10/1995 | Zarem et al. |
| 5,461,627 A | 10/1995 | Rypinski |
| 5,499,047 A | 3/1996 | Terry et al. |
| 5,513,176 A | 4/1996 | Dean et al. |
| 5,519,691 A | 5/1996 | Darcie et al. |
| 5,528,582 A | 6/1996 | Bodeep et al. |
| 5,533,011 A | 7/1996 | Dean et al. |
| 5,546,397 A | 8/1996 | Mahany |
| 5,552,920 A | 9/1996 | Glynn |
| 5,566,168 A | 10/1996 | Dent |
| 5,577,029 A | 11/1996 | Lu et al. |
| 5,579,341 A | 11/1996 | Smith et al. |
| 5,586,121 A | 12/1996 | Moura et al. |
| 5,587,734 A | 12/1996 | Lauder et al. |
| 5,592,470 A | 1/1997 | Rudrapatna et al. |
| 5,603,080 A | 2/1997 | Kallander et al. |
| 5,619,202 A | 4/1997 | Wilson et al. |
| 5,621,730 A | 4/1997 | Kelley |
| 5,621,786 A | 4/1997 | Fischer et al. |
| 5,627,879 A | 5/1997 | Russell et al. |
| 5,630,204 A | 5/1997 | Hylton et al. |
| 5,631,916 A | 5/1997 | Georges et al. |
| 5,634,191 A | 5/1997 | Beasley |
| 5,642,405 A | 6/1997 | Fischer et al. |
| 5,644,622 A | 7/1997 | Russell et al. |
| 5,657,374 A | 8/1997 | Russell et al. |
| 5,668,562 A | 9/1997 | Cutrer et al. |
| 5,678,177 A | 10/1997 | Beasley |
| 5,682,256 A | 10/1997 | Motley et al. |
| 5,682,403 A | 10/1997 | Tu et al. |
| 5,687,195 A | 11/1997 | Hwang et al. |
| 5,708,961 A | 1/1998 | Hylton et al. |
| 5,715,235 A | 2/1998 | Sawahashi et al. |
| D391,967 S | 3/1998 | Blais et al. |
| D391,968 S | 3/1998 | Shiozaki |
| 5,724,385 A | 3/1998 | Levin et al. |
| 5,732,076 A | 3/1998 | Ketseoglou et al. |
| 5,734,699 A | 3/1998 | Lu et al. |
| 5,734,979 A | 3/1998 | Lu et al. |
| 5,748,683 A | 5/1998 | Smith et al. |
| 5,752,170 A | 5/1998 | Clifford |
| 5,761,195 A | 6/1998 | Lu et al. |
| 5,761,619 A | 6/1998 | Danne et al. |
| 5,765,097 A | 6/1998 | Dail |
| 5,765,099 A | 6/1998 | Georges et al. |
| 5,771,449 A | 6/1998 | Blasing et al. |
| 5,774,085 A | 6/1998 | Yanagimoto et al. |
| 5,774,660 A | 6/1998 | Brendel et al. |
| 5,774,789 A | 6/1998 | van der Kaay et al. |
| 5,781,541 A | 7/1998 | Schneider |
| 5,781,582 A | 7/1998 | Sage et al. |
| 5,781,859 A | 7/1998 | Beasley |
| 5,781,865 A | 7/1998 | Gammon |
| D397,693 S | 9/1998 | Blais et al. |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,809,422 A | 9/1998 | Raleigh et al. |
| 5,809,431 A | 9/1998 | Bustamante et al. |
| 5,812,605 A | 9/1998 | Smith et al. |
| 5,818,824 A | 10/1998 | Lu et al. |
| 5,818,883 A | 10/1998 | Smith et al. |
| 5,822,324 A | 10/1998 | Kostresti et al. |
| 5,842,138 A | 11/1998 | Lu et al. |
| 5,845,199 A | 12/1998 | Longshore |
| 5,852,651 A | 12/1998 | Fischer et al. |
| 5,867,485 A | 2/1999 | Chambers et al. |
| 5,867,535 A | 2/1999 | Phillips et al. |

(56) References Cited

U.S. PATENT DOCUMENTS

| | | |
|---|---|---|
| 5,870,392 A | 2/1999 | Ann |
| 5,874,914 A | 2/1999 | Krasner |
| 5,878,325 A | 3/1999 | Dail |
| 5,883,882 A | 3/1999 | Schwartz |
| 5,887,256 A | 3/1999 | Lu et al. |
| 5,890,055 A | 3/1999 | Chu et al. |
| 5,898,680 A | 4/1999 | Johnstone et al. |
| 5,907,544 A | 5/1999 | Rypinski |
| 5,914,963 A | 6/1999 | Basile |
| 5,924,022 A | 7/1999 | Beasley et al. |
| 5,930,682 A | 7/1999 | Schwartz et al. |
| 5,946,622 A | 8/1999 | Bojeryd |
| 5,953,651 A | 9/1999 | Lu et al. |
| 5,966,442 A | 10/1999 | Sachdev |
| 5,969,837 A | 10/1999 | Farber et al. |
| 5,978,650 A | 11/1999 | Fischer et al. |
| 5,983,070 A | 11/1999 | Georges et al. |
| 5,987,014 A | 11/1999 | Magill et al. |
| 5,999,813 A | 12/1999 | Lu et al. |
| 6,005,506 A | 12/1999 | Bazarjani et al. |
| 6,005,884 A | 12/1999 | Cook et al. |
| 6,009,130 A | 12/1999 | Lurey et al. |
| 6,014,366 A | 1/2000 | Ichiyoshi |
| 6,014,546 A | 1/2000 | Georges et al. |
| 6,023,628 A | 2/2000 | Beasley |
| 6,034,950 A | 3/2000 | Sauer et al. |
| 6,047,162 A | 4/2000 | Lazaris-Brunner et al. |
| 6,061,089 A | 5/2000 | Tonkin et al. |
| 6,078,823 A | 6/2000 | Chavez et al. |
| 6,081,716 A | 6/2000 | Lu |
| 6,101,400 A | 8/2000 | Ogaz et al. |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,122,529 A | 9/2000 | Sabat, Jr. et al. |
| 6,128,470 A | 10/2000 | Naidu |
| 6,128,471 A | 10/2000 | Quelch et al. |
| 6,147,786 A | 11/2000 | Pan |
| 6,150,993 A | 11/2000 | Dobrovolny |
| 6,157,659 A | 12/2000 | Bird |
| 6,157,810 A | 12/2000 | Georges et al. |
| 6,169,907 B1 | 1/2001 | Chang et al. |
| 6,173,177 B1 | 1/2001 | Lu et al. |
| 6,181,687 B1 | 1/2001 | Bisdikian |
| 6,188,693 B1 | 2/2001 | Murakami |
| 6,192,216 B1 | 2/2001 | Sabat, Jr. et al. |
| 6,198,558 B1 | 3/2001 | Graves et al. |
| 6,212,395 B1 | 4/2001 | Lu et al. |
| 6,222,660 B1 | 4/2001 | Traa |
| 6,223,021 B1 | 4/2001 | Silvia et al. |
| 6,226,274 B1 | 5/2001 | Reese et al. |
| 6,246,675 B1 | 6/2001 | Beasley et al. |
| 6,253,094 B1 | 6/2001 | Schmutz |
| 6,259,910 B1 | 7/2001 | Fairfield et al. |
| 6,262,981 B1 | 7/2001 | Schmutz |
| 6,263,135 B1 | 7/2001 | Wade |
| 6,269,255 B1 | 7/2001 | Waylett |
| 6,275,990 B1 | 8/2001 | Dapper et al. |
| 6,298,246 B1 | 10/2001 | Lysejko et al. |
| 6,307,877 B1 | 10/2001 | Philips et al. |
| 6,308,085 B1 | 10/2001 | Shoki |
| 6,317,884 B1 | 11/2001 | Eames et al. |
| 6,336,042 B1 | 1/2002 | Dawson et al. |
| 6,337,754 B1 | 1/2002 | Imajo |
| 6,349,200 B1 | 2/2002 | Sabat, Jr. et al. |
| 6,353,600 B1 | 3/2002 | Schwartz et al. |
| 6,356,369 B1 | 3/2002 | Farhan |
| 6,356,374 B1 | 3/2002 | Farhan |
| 6,362,908 B1 | 3/2002 | Kimbrough et al. |
| 6,373,611 B1 | 4/2002 | Farhan et al. |
| 6,373,887 B1 | 4/2002 | Aiyagari et al. |
| 6,374,124 B1 | 4/2002 | Slabinski |
| 6,377,640 B2 | 4/2002 | Trans |
| 6,381,463 B1 | 4/2002 | Tu et al. |
| 6,411,616 B1 | 6/2002 | Donahue et al. |
| 6,442,405 B1 | 8/2002 | Hiramatsu et al. |
| 6,449,071 B1 | 9/2002 | Farhan et al. |
| 6,463,301 B1 | 10/2002 | Bevan et al. |
| 6,466,572 B1 | 10/2002 | Ethridge et al. |
| 6,480,551 B1 | 11/2002 | Ohishi et al. |
| 6,480,702 B1 | 11/2002 | Sabat, Jr. |
| 6,486,907 B1 | 11/2002 | Farber et al. |
| 6,498,936 B1 | 12/2002 | Raith |
| 6,504,831 B1 | 1/2003 | Greenwood et al. |
| 6,535,720 B1 | 3/2003 | Kintis et al. |
| 6,535,732 B1 | 3/2003 | McIntosh et al. |
| 6,549,772 B1 | 4/2003 | Chavez et al. |
| 6,553,111 B1 | 4/2003 | Wang |
| 6,556,551 B1 | 4/2003 | Schwartz |
| 6,567,473 B1 | 5/2003 | Tzannes |
| 6,580,905 B1 | 6/2003 | Naidu et al. |
| 6,580,924 B1 | 6/2003 | Lu et al. |
| 6,594,496 B2 | 7/2003 | Schwartz |
| 6,597,912 B1 | 7/2003 | Lu et al. |
| 6,622,013 B1 | 9/2003 | Miyoshi et al. |
| 6,640,108 B2 | 10/2003 | Lu et al. |
| 6,643,498 B1 | 11/2003 | Miyajima |
| 6,658,259 B2 | 12/2003 | McIntosh |
| 6,667,973 B1 | 12/2003 | Gorshe et al. |
| 6,674,966 B1 | 1/2004 | Koonen |
| 6,675,004 B1 | 1/2004 | Waylett |
| 6,694,134 B1 | 2/2004 | Lu et al. |
| 6,697,603 B1 | 2/2004 | Lovinggood et al. |
| 6,704,545 B1 | 3/2004 | Wala |
| 6,729,929 B1 | 5/2004 | Sayers et al. |
| 6,731,904 B1 | 5/2004 | Judd |
| 6,738,581 B2 | 5/2004 | Handelman |
| 6,745,003 B1 | 6/2004 | Maca et al. |
| 6,751,417 B1 | 6/2004 | Combs et al. |
| 6,757,553 B1 | 6/2004 | English |
| 6,768,745 B1 | 7/2004 | Gorshe et al. |
| 6,771,933 B1 | 8/2004 | Eng et al. |
| 6,785,558 B1 | 8/2004 | Stratford et al. |
| 6,799,020 B1 | 9/2004 | Heidmann et al. |
| 6,801,767 B1 | 10/2004 | Schwartz et al. |
| 6,807,374 B1 | 10/2004 | Imajo et al. |
| 6,826,163 B2 | 11/2004 | Mani et al. |
| 6,826,164 B2 | 11/2004 | Mani et al. |
| 6,829,477 B1 | 12/2004 | Lu et al. |
| 6,831,901 B2 | 12/2004 | Millar |
| 6,847,653 B1 | 1/2005 | Smiroldo |
| 6,865,390 B2 | 3/2005 | Goss et al. |
| 6,907,048 B1 | 6/2005 | Treadaway et al. |
| 6,912,409 B2 | 6/2005 | Waylett |
| 6,917,614 B1 | 7/2005 | Laubach et al. |
| 6,931,261 B2 | 8/2005 | Waylett et al. |
| 6,963,552 B2 | 11/2005 | Sabat et al. |
| 6,967,966 B1 | 11/2005 | Donohue |
| 6,980,831 B2 | 12/2005 | Matsuyoshi et al. |
| 7,016,308 B1 | 3/2006 | Gallagher |
| 7,031,335 B1 | 4/2006 | Donohue et al. |
| 7,035,671 B2 | 4/2006 | Solum |
| 7,047,313 B1 | 5/2006 | Broerman |
| 7,075,369 B2 | 7/2006 | Takenaka |
| 7,103,279 B1 | 9/2006 | Koh et al. |
| 7,103,377 B2 | 9/2006 | Bauman et al. |
| 7,127,175 B2 | 10/2006 | Mani et al. |
| 7,171,244 B2 | 1/2007 | Bauman |
| 7,184,728 B2 | 2/2007 | Solum |
| 7,190,903 B1 | 3/2007 | Combs et al. |
| 7,205,864 B2 | 4/2007 | Schultz, Jr. et al. |
| 7,215,651 B2 | 5/2007 | Millar |
| 7,257,328 B2 | 8/2007 | Levinson et al. |
| 7,289,972 B2 | 10/2007 | Rieser et al. |
| 7,313,415 B2 | 12/2007 | Wake et al. |
| RE40,564 E | 11/2008 | Fischer et al. |
| 7,474,852 B1 | 1/2009 | Jachetta et al. |
| 7,505,747 B2 | 3/2009 | Solum |
| 7,512,419 B2 | 3/2009 | Solum et al. |
| 7,539,509 B2 | 5/2009 | Bauman et al. |
| 7,548,695 B2 | 6/2009 | Wake |
| 7,610,046 B2 | 10/2009 | Wala |
| 7,614,074 B2 | 11/2009 | Mobley et al. |

(56) References Cited

U.S. PATENT DOCUMENTS

| | | | |
|---|---|---|---|
| 7,639,982 B2 | 12/2009 | Wala | |
| 7,702,985 B2 | 4/2010 | Millar | |
| 7,733,901 B2 | 6/2010 | Salkini et al. | |
| 7,761,093 B2 | 7/2010 | Sabat, Jr. et al. | |
| 7,787,854 B2 | 8/2010 | Conyers et al. | |
| 5,627,879 C1 | 9/2010 | Russell et al. | |
| 5,657,374 C1 | 9/2010 | Russell et al. | |
| 7,826,507 B2 | 11/2010 | Nishiguchi et al. | |
| 7,848,747 B2 | 12/2010 | Wala | |
| 7,848,770 B2 | 12/2010 | Scheinert | |
| 7,917,177 B2 | 3/2011 | Bauman | |
| 40,564 C1 | 4/2011 | Fischer et al. | |
| 7,920,858 B2 | 4/2011 | Sabat, Jr. et al. | |
| 7,962,111 B2 | 6/2011 | Solum | |
| 8,019,221 B2 | 9/2011 | Zancewicz | |
| 8,027,270 B1 | 9/2011 | Campana et al. | |
| 8,032,916 B2 | 10/2011 | Oyadomari et al. | |
| 8,160,570 B2 | 4/2012 | Sabat, Jr. et al. | |
| 8,290,483 B2 | 10/2012 | Sabat, Jr. et al. | |
| 8,326,218 B2 | 12/2012 | Wala | |
| RE43,964 E | 2/2013 | Fischer et al. | |
| 8,446,530 B2 | 5/2013 | Bellers | |
| 8,462,683 B2 | 6/2013 | Uyehara et al. | |
| 8,472,579 B2 | 6/2013 | Uyehara et al. | |
| 8,504,091 B2 * | 8/2013 | Palanki | H04W 72/0413 455/522 |
| 8,532,242 B2 | 9/2013 | Fischer et al. | |
| 8,559,939 B2 | 10/2013 | Sabat, Jr. et al. | |
| 8,577,286 B2 | 11/2013 | Wala | |
| 8,583,100 B2 | 11/2013 | Koziy et al. | |
| 8,693,342 B2 | 4/2014 | Uyehara et al. | |
| 8,737,454 B2 | 5/2014 | Wala et al. | |
| 8,837,659 B2 | 9/2014 | Uyehara et al. | |
| 8,873,585 B2 | 10/2014 | Oren et al. | |
| RE45,321 E | 1/2015 | Fischer et al. | |
| 8,958,789 B2 | 2/2015 | Bauman et al. | |
| 9,332,402 B2 | 5/2016 | Wala | |
| 9,572,178 B1 | 2/2017 | Seo et al. | |
| 9,585,193 B2 | 2/2017 | Wala et al. | |
| 9,867,052 B2 | 1/2018 | Sabat, Jr. et al. | |
| 9,941,921 B2 | 4/2018 | Wala et al. | |
| 10,020,850 B2 | 7/2018 | Wala et al. | |
| 2001/0017849 A1 | 8/2001 | Campanella et al. | |
| 2001/0031014 A1 | 10/2001 | Subramanian et al. | |
| 2001/0036163 A1 | 11/2001 | Sabat et al. | |
| 2001/0044292 A1 | 11/2001 | Jeon et al. | |
| 2002/0003645 A1 | 1/2002 | Kim et al. | |
| 2002/0027892 A1 | 3/2002 | Sasaki | |
| 2002/0072329 A1 | 6/2002 | Bandeira et al. | |
| 2002/0142739 A1 | 10/2002 | Smith | |
| 2002/0167954 A1 | 11/2002 | Highsmith et al. | |
| 2002/0191565 A1 | 12/2002 | Mani et al. | |
| 2003/0015943 A1 | 1/2003 | Kim et al. | |
| 2003/0040335 A1 | 2/2003 | McIntosh et al. | |
| 2003/0043928 A1 | 3/2003 | Ling et al. | |
| 2003/0060178 A1 | 3/2003 | Ghassemzadeh et al. | |
| 2003/0066087 A1 | 4/2003 | Sawyer et al. | |
| 2003/0133182 A1 | 7/2003 | Ng et al. | |
| 2003/0143947 A1 | 7/2003 | Lyu | |
| 2003/0157943 A1 | 8/2003 | Sabat, Jr. | |
| 2003/0162516 A1 | 8/2003 | Solum | |
| 2003/0203717 A1 | 10/2003 | Chuprun et al. | |
| 2004/0008737 A1 | 1/2004 | McClellan | |
| 2004/0010609 A1 | 1/2004 | Vilander et al. | |
| 2004/0032354 A1 | 2/2004 | Knobel et al. | |
| 2004/0037565 A1 | 2/2004 | Young et al. | |
| 2004/0053602 A1 | 3/2004 | Wurzburg | |
| 2004/0062214 A1 | 4/2004 | Schnack et al. | |
| 2004/0100930 A1 | 5/2004 | Shapira et al. | |
| 2004/0106387 A1 | 6/2004 | Bauman et al. | |
| 2004/0106435 A1 | 6/2004 | Bauman et al. | |
| 2004/0110534 A1 | 6/2004 | Chung et al. | |
| 2004/0132474 A1 | 7/2004 | Wala | |
| 2004/0166898 A1 | 8/2004 | Tajima | |
| 2004/0196834 A1 | 10/2004 | Ofek et al. | |
| 2004/0198453 A1 | 10/2004 | Cutrer et al. | |
| 2004/0203339 A1 | 10/2004 | Bauman | |
| 2004/0203703 A1 | 10/2004 | Fischer | |
| 2004/0204105 A1 | 10/2004 | Liang et al. | |
| 2004/0219950 A1 | 11/2004 | Pallonen et al. | |
| 2004/0224637 A1 * | 11/2004 | Silva | H04B 7/04 455/63.4 |
| 2005/0007993 A1 | 1/2005 | Chambers et al. | |
| 2005/0084076 A1 | 4/2005 | Dhir et al. | |
| 2005/0088999 A1 | 4/2005 | Waylett et al. | |
| 2005/0131645 A1 | 6/2005 | Panopoulos | |
| 2005/0147067 A1 | 7/2005 | Mani et al. | |
| 2005/0153712 A1 | 7/2005 | Osaka et al. | |
| 2005/0172198 A1 | 8/2005 | Millar | |
| 2005/0201323 A1 | 9/2005 | Mani et al. | |
| 2005/0243785 A1 | 11/2005 | Sabat, Jr. et al. | |
| 2005/0250503 A1 | 11/2005 | Cutrer | |
| 2005/0250541 A1 | 11/2005 | Bird et al. | |
| 2006/0026017 A1 | 2/2006 | Walker | |
| 2006/0029171 A1 | 2/2006 | Jensen | |
| 2006/0040615 A1 | 2/2006 | Mohamadi | |
| 2006/0066484 A1 | 3/2006 | Sayers | |
| 2006/0094470 A1 | 5/2006 | Wake et al. | |
| 2006/0111047 A1 | 5/2006 | Louberg et al. | |
| 2006/0121944 A1 | 6/2006 | Buscaglia et al. | |
| 2006/0128347 A1 | 6/2006 | Piriyapoksombut et al. | |
| 2006/0153070 A1 | 7/2006 | DelRegno et al. | |
| 2006/0172775 A1 | 8/2006 | Conyers et al. | |
| 2006/0193295 A1 | 8/2006 | White et al. | |
| 2006/0209752 A1 | 9/2006 | Wijngaarden et al. | |
| 2006/0221905 A1 | 10/2006 | Behzad et al. | |
| 2006/0283952 A1 | 12/2006 | Wang | |
| 2007/0008939 A1 | 1/2007 | Fischer | |
| 2007/0127383 A1 | 6/2007 | Borella | |
| 2007/0147278 A1 | 6/2007 | Millar | |
| 2007/0166036 A1 | 7/2007 | Combs et al. | |
| 2007/0274279 A1 | 11/2007 | Wood et al. | |
| 2008/0014948 A1 | 1/2008 | Scheinert | |
| 2008/0058018 A1 | 3/2008 | Scheinert | |
| 2008/0181282 A1 | 7/2008 | Wala et al. | |
| 2008/0192855 A1 | 8/2008 | Shapira et al. | |
| 2008/0232328 A1 * | 9/2008 | Scheinert | G01S 5/02 370/335 |
| 2008/0240164 A1 | 10/2008 | Zavadsky | |
| 2008/0242232 A1 * | 10/2008 | Zavadsky | H04B 17/0087 455/67.11 |
| 2008/0267142 A1 | 10/2008 | Mushkin et al. | |
| 2008/0287153 A1 | 11/2008 | Fullam | |
| 2009/0034979 A1 | 2/2009 | Zancewicz | |
| 2009/0061940 A1 | 3/2009 | Scheinert et al. | |
| 2009/0067363 A1 | 3/2009 | Ruiz et al. | |
| 2009/0067841 A1 | 3/2009 | Combs et al. | |
| 2009/0129314 A1 | 5/2009 | Weniger et al. | |
| 2009/0180407 A1 | 7/2009 | Sabat et al. | |
| 2009/0207942 A1 | 8/2009 | Lin et al. | |
| 2009/0316608 A1 | 12/2009 | Singh et al. | |
| 2009/0316611 A1 | 12/2009 | Stratford et al. | |
| 2009/0318089 A1 * | 12/2009 | Stratford | H04W 88/085 455/67.11 |
| 2010/0046494 A1 | 2/2010 | Palanki et al. | |
| 2010/0061291 A1 | 3/2010 | Wala | |
| 2010/0093391 A1 | 4/2010 | Saban et al. | |
| 2010/0135276 A1 | 6/2010 | Hedin et al. | |
| 2010/0215028 A1 | 8/2010 | Fischer | |
| 2010/0255855 A1 | 10/2010 | Sabat, Jr. et al. | |
| 2011/0143649 A1 | 6/2011 | Sabat, Jr. et al. | |
| 2011/0182583 A1 | 7/2011 | Rakib | |
| 2011/0237182 A1 | 9/2011 | Stratford et al. | |
| 2011/0243291 A1 | 10/2011 | McAllister et al. | |
| 2011/0265140 A1 | 10/2011 | Rakib | |
| 2011/0280209 A1 | 11/2011 | Wegener | |
| 2012/0027145 A1 | 2/2012 | Uyehara et al. | |
| 2012/0093084 A1 | 4/2012 | Wala et al. | |
| 2012/0184268 A1 | 7/2012 | Sabat, Jr. et al. | |
| 2012/0281622 A1 | 11/2012 | Saban et al. | |
| 2013/0012195 A1 | 1/2013 | Sabat, Jr. et al. | |
| 2013/0017863 A1 | 1/2013 | Kummetz et al. | |
| 2013/0122952 A1 | 5/2013 | Wala | |
| 2013/0272463 A1 | 10/2013 | Uyehara et al. | |

(56) References Cited

U.S. PATENT DOCUMENTS

| | | | |
|---|---|---|---|
| 2014/0036758 A1 | 2/2014 | Wala | |
| 2014/0036780 A1 | 2/2014 | Sabat, Jr. et al. | |
| 2014/0243033 A1 | 8/2014 | Wala et al. | |
| 2015/0016441 A1* | 1/2015 | Hanson | H04W 16/02 370/338 |
| 2016/0066331 A1* | 3/2016 | Harel | H04B 7/024 370/252 |
| 2016/0135184 A1* | 5/2016 | Zavadsky | H04B 7/04 370/329 |
| 2016/0248508 A1 | 8/2016 | Wala | |
| 2016/0299525 A1* | 10/2016 | Cho | G06F 1/10 |
| 2017/0064722 A1* | 3/2017 | Tarlazzi | H04B 17/12 |
| 2017/0170864 A1 | 6/2017 | Wala et al. | |
| 2017/0180142 A1* | 6/2017 | Hunter, Jr. | H04L 12/10 |
| 2017/0214460 A1 | 7/2017 | Wala | |
| 2018/0115910 A1 | 4/2018 | Sabat, Jr. et al. | |
| 2018/0323831 A1 | 11/2018 | Wala et al. | |

FOREIGN PATENT DOCUMENTS

| | | |
|---|---|---|
| CA | 2069462 A1 | 7/1993 |
| CA | 2087285 | 1/1994 |
| CA | 2138763 A1 | 1/1994 |
| CA | 2156046 A1 | 1/1995 |
| CA | 2125411 C | 5/1995 |
| CA | 2128842 A1 | 1/1996 |
| CA | 2134365 C | 4/1996 |
| CA | 2158386 A1 | 3/1997 |
| CA | 2168681 A1 | 8/1997 |
| CA | 2008900 | 1/1998 |
| CA | 2215079 A1 | 3/1999 |
| CN | 1127056 A | 7/1996 |
| CN | 1362799 A | 8/2002 |
| CN | 1455993 A | 11/2003 |
| CN | 1719761 A | 1/2006 |
| CN | 101018064 A | 8/2007 |
| CN | 101283551 A | 10/2008 |
| CN | 101355778 A | 1/2009 |
| CN | 100466494 | 3/2009 |
| CN | 102084606 A | 6/2011 |
| CN | 102084614 A | 6/2011 |
| DE | 3707244 A1 | 9/1988 |
| EP | 0166885 A2 | 1/1986 |
| EP | 0346925 A2 | 12/1989 |
| EP | 0368673 A1 | 5/1990 |
| EP | 0391597 A2 | 10/1990 |
| EP | 0468688 A2 | 1/1992 |
| EP | 0633705 A2 | 1/1995 |
| EP | 0642243 A1 | 3/1995 |
| EP | 0664621 A1 | 7/1995 |
| EP | 0876073 A2 | 11/1998 |
| EP | 0935385 A2 | 8/1999 |
| EP | 1032143 A2 | 8/2000 |
| EP | 1047276 A2 | 10/2000 |
| EP | 1214809 B1 | 3/2006 |
| EP | 1739871 A2 | 1/2007 |
| EP | 1269776 B1 | 7/2009 |
| EP | 2094058 A2 | 8/2009 |
| EP | 2290850 A1 | 3/2011 |
| EP | 1303929 B1 | 10/2011 |
| EP | 2364056 B1 | 11/2012 |
| EP | 1570626 B1 | 11/2013 |
| EP | 3035562 A1 | 6/2016 |
| FR | 2345865 A1 | 10/1977 |
| GB | 2253770 A | 9/1992 |
| GB | 2289198 A | 11/1995 |
| GB | 2300549 A | 11/1996 |
| GB | 2315959 A | 2/1998 |
| GB | 2320653 A | 6/1998 |
| GB | 2347319 A | 8/2000 |
| GB | 2386037 A | 9/2003 |
| IT | 540424 | 3/1956 |
| JP | 58164007 | 9/1983 |
| JP | 3026031 B2 | 2/1991 |
| JP | H0512374 A | 1/1993 |
| JP | H05153021 A | 6/1993 |
| JP | H05268128 A | 10/1993 |
| JP | 6318905 A | 11/1994 |
| JP | 8510878 | 11/1996 |
| JP | H11234200 A | 8/1999 |
| JP | 2000333240 A | 11/2000 |
| JP | 2001197012 A | 7/2001 |
| JP | 2002354534 A | 12/2002 |
| JP | 2003023396 A | 1/2003 |
| JP | 2004180220 A | 6/2004 |
| JP | 2004194351 A | 7/2004 |
| KR | 1019970055364 | 12/1999 |
| KR | 100594770 B1 | 7/2006 |
| KR | 1020080015462 A | 2/2008 |
| KR | 20090113369 A | 10/2009 |
| KR | 1020100011297 A | 2/2010 |
| KR | 1020100080062 A | 7/2010 |
| WO | 9115927 A1 | 10/1991 |
| WO | 9413067 A1 | 6/1994 |
| WO | 9428690 A1 | 12/1994 |
| WO | 9533350 A1 | 12/1995 |
| WO | 9628946 A1 | 9/1996 |
| WO | 9629834 A1 | 9/1996 |
| WO | 9705704 A1 | 2/1997 |
| WO | 9716000 A1 | 5/1997 |
| WO | 9732442 A1 | 9/1997 |
| WO | 9824256 A2 | 6/1998 |
| WO | 9824256 A3 | 8/1998 |
| WO | 9837715 A2 | 8/1998 |
| WO | 9909769 A1 | 2/1999 |
| WO | 9937035 A1 | 7/1999 |
| WO | 9948312 A1 | 9/1999 |
| WO | 0021221 A1 | 4/2000 |
| WO | 0117156 A1 | 3/2001 |
| WO | 0156197 A2 | 8/2001 |
| WO | 0174013 A2 | 10/2001 |
| WO | 0174100 A1 | 10/2001 |
| WO | 0182642 A1 | 11/2001 |
| WO | 029319 A1 | 1/2002 |
| WO | 0209319 A1 | 1/2002 |
| WO | 0239624 A2 | 5/2002 |
| WO | 03079645 A2 | 9/2003 |
| WO | 2004006602 A1 | 1/2004 |
| WO | 2004051322 A2 | 6/2004 |
| WO | 2005122696 A2 | 12/2005 |
| WO | 2006135697 A1 | 12/2006 |
| WO | 2007075579 A2 | 7/2007 |
| WO | 2008092067 A2 | 7/2008 |
| WO | 2009012448 A2 | 1/2009 |
| WO | 2009138876 A2 | 11/2009 |
| WO | 2009151893 A2 | 12/2009 |
| WO | 2009155602 A1 | 12/2009 |
| WO | 2012015892 A2 | 2/2012 |

OTHER PUBLICATIONS

Lewis, "ADC-Kentrox Call Report With Bell Atlantic", Oct. 18, 1992, pp. 1-3.

Lin et al., "Heterogeneous Personal Communications Services: Integration of PCS Systems", IEEE Communications Magazine, Sep. 1996, pp. 106-112, IEEE.

Merrett et al., "A Cordless Access System Using Radio-Over-Fibre Techniques", "Gateway to the Future Technology in Motion", May 22, 1991, pp. Cover—924, Publisher: 41st IEEE Vehicular Technology Conference.

Microwaves & RF, "Digital Transport for Cellular", Feb. 1993, p. 1.

Nakatsugawa, et al., "Software Radio Base and Personal Stations for Cellular/PCS Systems", Vehicular Technology Conference Proceedings, May 18, 2000, pp. 617-621, Publisher: IEEE.

Oades, "The Linear RF Repeater", "1980 International Conference on Communications", Jun. 8-12, 1980, p. 1, Publisher: IEEE.

O'Byrne, "TDMA and CDMA in a Fiber-Optic Environment", "Vehicular Technology Conference, 1988, IEEE 38th", Jun. 1992, pp. 727-731, Publisher: IEEE1-5, IEEE.

Payne et al., "Single Mode Optical Local Networks", "Globecom '85", Dec. 5, 1985, pp. 1200-1206, Publisher: IEEE Global Telecommunications Conference.

(56) References Cited

OTHER PUBLICATIONS

Quinn, "The Cell Enhancer", "Vehicular Technology Conference", May 22, 1986, pp. 77-83, Publisher: Bell Atlantic Mobile Systems.
Rosenbloom et al., "Cell Enhancer: Beyond the Outer Limits", pp. 1-2.
Russell, "New Microcell Technology Sets Cellular Carriers Free", "Telephony Mar. 1993", pp. 40-42, Publisher: ADC Kentrox, Published in: US.
ZoneMaster, "Maximum Coverage for High-Capacity Locations", 1993, pp. 1-4, Publisher: Decibel Multi Media Microcell System.
Schneiderman, "Offshore Markets Gain in Size, Competitiveness Even the Smallest Industry Companies Are Expanding Their Global Buisness", "Microwaves and RF", Mar. 1993, pp. 33-39, vol. 32, No. 3, Publisher: Penton Publishing, Inc.
Siala et al., "Equalization for Orthogonal Frequency Division Multiplexing System", 1993, pp. 649-652, Publisher: IEEE.
Spectracom, "White Paper: A Master Clock Approach to Distributing Precision Time and Frequency", "https://spectracom.com/sites/default/files/document-files/Time_and_Frequency_Distribution_WP11-101_A.pdf", Jan. 31, 2014, pp. 1-5, Publisher: Spectracom.
Steele, "Towards a High-Capacity Digital Cellular Mobile Radio System", "Special Issue on Land Mobile Radio", Aug. 1985, pp. 405-415, vol. 132, No. Pt. F, No. 5, Publisher: IEEE Proceedings.
Tang, "Fiber Optic Antenna Remoting for Multi-Sector Cellular Cell Sites", GTE Laboratories, Jul. 9, 1993, pp. 1-22.
Tang, "Fiber-Optic Antenna Remoting for MultiSector Cellular Cell Sites", GTE Laboratories Incorporated, Jan. 1, 1992, pp. 76-81, IEEE.
Tektronix, "Synchronous Optical Network (SONET)", "http://www.iec.org/online/tutorials/sonet/topic03.html", Aug. 28, 2002, pp. 1-5, Publisher: International Engineering Consortium.
Titch, "Kentrox Boosts Coverage and Capacity", "Telephony", Jan. 25, 1993, pp. 11-12.
Wala, "A New Microcell Architecture Using Digital Optical Transport, Freedom Through Wireless Technology", May 18, 1993, pp. 585-588, Publisher: Proceedings of the Vehicular Technology Conference, New York IEEE.
Zhaohui et al., "A Rake Type Receiver Structure for CDMA Mobile Communication Systems Using Antenna Arrays", 1996, pp. 528-530, Publisher: IEEE.
Commscope, "CommScope Completes Transformational Acquisition of TE Connectivity's Telecom, Enterprise and Wireless Businesses", Aug. 28, 2015, pp. 1-4.
TE Connectivity, "Innovative Solution to Cut Costs of Delivering Mobile Ultra-broadband Access", Feb. 20, 2014, pp. 1-4.
Wikipedia, "Summation", Dec. 18, 2018, pp. 1-11, Wikipedia.
Wikipedia, "T-carrier", Oct. 21, 2018, pp. 1-6, Wikipedia.
"DigivanceTM, Indoor Coverage Solution", "www.adc.com", 2001, pp. 1-8, Publisher: ADC.
"ADC Kentrox Expands RF Technology Base with Acquisition of Waseca Technology Inc.", ADC Kentrox, Jun. 9, 1993, pp. 1-2, ADC Telecommunications, Inc.
"And Now a Few Words From Your Customers . . . ", Aug. 1, 1992, pp. 1-4, Publisher: ADC Kentrox.
"Digitial AMPS", Wikipedia, Nov. 17, 2017, pp. 1-7.
"Mixed-Signal Design Seminar", Analog Devices, Inc., 1991, pp. 1-3, U.S.
"Personal communications network", Wikipedia, Mar. 19, 2018, p. 1.
"Photographs of ADC Kentrox City Cell 824 Components, Publication Date Unknown", pp. 1-14.
"Star network", Wikipedia, Sep. 10, 2018, pp. 1-2.
"Vehicular Technology Society 42nd VTS Conference Frontiers of Technology", Pioneers to the 21st Century, May 1992, pp. 1-5.
"Widen Your Horizons to a World of Solutions", ADC Telecommunications Wireless Systems Division, 1994, pp. 1-8.
1998 Foxcom Wireless Proprietary Information, "Application Note: RFiber—RF Fiberoptic Links for Wireless Applications", "RFiber Application Book", 1998, pp. 3-11, Published in: US.
ADC Kentrox, "ADC Kentrox Introduces Citycell 824, A Replacement for Conventional Cell Sites; Company's Original Goal Was to Improve Fiber Optic T1 Links Between Cells, MTSOs", "Telocator Bulletin", Feb. 1993, pp. 1-2, Publisher: CityCell.
ADC Kentrox, "ADC Kentrox Introduces Innovative Wireless Network Access Solution", Mar. 1, 1993, pp. 1-3, Published in: US.
ADC Kentrox, "Wireless Systems Group Citycell 824—A Positioning White Paper", Mar. 1993, pp. 1-6, Publisher: CITA Trade Show.
ADC, "First Field Trial Results Exceed Expectations", Mar. 2, 1993, pp. 1-2, Published in: US.
Akos, et al., "Direct Bandpass Sampling of Multiple Distinct RF Signals", IEEE Transactions on Communications, Jul. 1999, pp. 983-988, vol. 47, No. 7, Publisher: IEEE.
Kobb, "Personal Wireless", Spectrum, Jun. 1993, pp. 1-8, vol. 30, No. 6, Publisher: IEEE, Published in: US
Ameritech, "Broadband Optical Transport Digital Microcell Connection Service—Interface and Performance Specifications", Dec. 1993, Page(s) Cover—26, No. 1, Publisher: Ameritech.
Anaren, "Anaren Microwave Components", pp. 1-2.
Anon, "2 GHz Repeater Built Without I-F", "Microwaves", Jun. 1976, pp. 1-2, vol. 15, No. 6, p. 16, Publisher: Hayden Publishing Company Inc.
Brunner et al., "On Space-Time Rake Receiver Structures for WCDMA", Oct. 1999, pp. 1-6, IEEE.
Cellular Industry, The Day Group, "New Signal Transport Technology Digitizes the Cellular Band", Dec. 22, 2000, pp. 1-2.
Cheun, "Performance of Direct-Sequence Spread-Spectrum RAKE Receivers with Random Spreading Sequences", IEEE Transactions on Communications, Sep. 1997, pp. 1-14, vol. 45, No. 9, IEEE.
CityCell, Cellular Industry the Day Group, "ADC Kentrox CityCell Field Trial Yields Another First—Simultaneous Analog and Digital Calls", prior to Dec. 22, 2000, p. 1.
Cox, et al., "A Radio System Proposal for Widespread Low-Power Tetherless Communications", IEEE Transactions on Communications, Feb. 1991, pp. 324-335, vol. 39, No. 2, IEEE.
Crofut, "Remote monitoring of wireless base stations", Jun. 1, 1998, pp. 1-4, www.urgentcomm.com/print/mag/remote-monitoring-wireless-base-stations.
Cyr et al., "The digital age is here; Digital radio frequency transport enhances cellular network performance", Telephony, Jul. 5, 1993, pp. 20-24.
ADC Kentrox, "CityCell 824 Host-Site User Manual", Sep. 25, 1993, pp. 1-110.
ADC Kentrox, "CityCell 824 Remote-Site Manual", ADC Kentrox, Feb. 1, 1993, pp. 1-105.
Ericksson, "Advertisement by Ericksson", "Telephony", 1994, p. 1.
Ishio et al., "A Two-Way Wavelength-Division-Multiplexing Transmission and its Application to a Switched TV-Distribution System", Conference Record, Fourth European Conference on Optical Communication, Sep. 12, 1978, pp. 645-665, Publisher: IIC.
Foxcom Wireless Propriety Information, "Litenna In-Building RF Distribution System", White Paper Document No. 42-14-001-09C, 1998, pp. 1-8, Foxcom Wireless.
Grace, "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Graf, "Modern Dictionary of Electronics—Seventh Edition", 1999, pp. 1-9, Butterworth-Heinemann.
Grundmann et al., "An Empirical Comparison of a Distributed Antenna Microcell System Versus a Single Antenna Microcell System for Indoor Spread Spectrum Communications at 1.8 GHz", ICUPC ' 93, 1993, pp. 59-63, IEEE.
GTE Laboratories, "Urban Microcell System Layout", GTE Laboratories Conference, Jun. 14-18, 1992, pp. 1-13.
Gupta et al., "Land Mobile Radio Systems—A Tutorial Exposition", Jun. 1985, pp. 33-45, vol. 23, No. 6, Publisher: IEEE Communications Magazine.
Harvey et al., "Cordless Communications Utilising Radio Over Fibre Techniques for the Local Loop", "IEEE International Conference on Communications", Jun. 1991, pp. 1171-1175, Publisher: IEEE.

(56) References Cited

OTHER PUBLICATIONS

Horowitz, "Digital Electronics", "Chapter 8: Basic Logic Concepts", "The Art of Electronics", 1980, p. 316, Publisher Press Syndicate of the University of Cambridge.
IEE, "Electronics Letters an International Publication", Nov. 19, 1987, pp. 1-4, vol. 23, No. 24, Publisher: The Institution of Electrical Engineers.

\* cited by examiner

SYSTEMS AND METHODS FOR ASSIGNING CONTROLLED NODES TO CHANNEL INTERFACES OF A CONTROLLER

CROSS-REFERENCE TO RELATED APPLICATIONS

This application claims the benefit of U.S. Provisional Patent Application Ser. No. 62/254,470 filed on Nov. 12, 2015, which is hereby incorporated herein by reference.

BACKGROUND

Communications systems are used to communicate communication signals and may include a controller and one or more controlled nodes communicatively coupled together through communication channels.

SUMMARY

A controller is configured to provide signals to a plurality of controlled nodes, the controller includes a plurality of channel interfaces including a first channel interface configured to be communicatively coupled to a first controlled node of the plurality of controlled nodes; and a second channel interface configured to be communicatively coupled to a second controlled node of the plurality of controlled nodes. The controller is configured to perform discovery of which channel interface of the controller is coupled to which controlled node of the plurality of controlled nodes by being configured to communicate a first measurement request signal from the first channel interface toward the first controlled node of a plurality of controlled nodes; communicate a second measurement request signal from the second channel interface toward the second controlled node of the plurality of controlled nodes; communicate at least one power level request signal from at least one channel interface of the plurality of channel interfaces of the controller to at least one of the first controlled node and the second controlled node; receive a set of power levels from both the first controlled node and the second controlled node at the controller in response to the at least one power level request signal; determine that the first controlled node is more strongly signal-coupled with the first channel interface than the second controlled node when the first power level received from the first controlled node is higher than the first power level received from the second controlled node; and determine that the second controlled node is more strongly signal-coupled with the first channel interface than the first controlled node when the first power level received from the second controlled node is higher than the first power level received from the second controlled node.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1A:
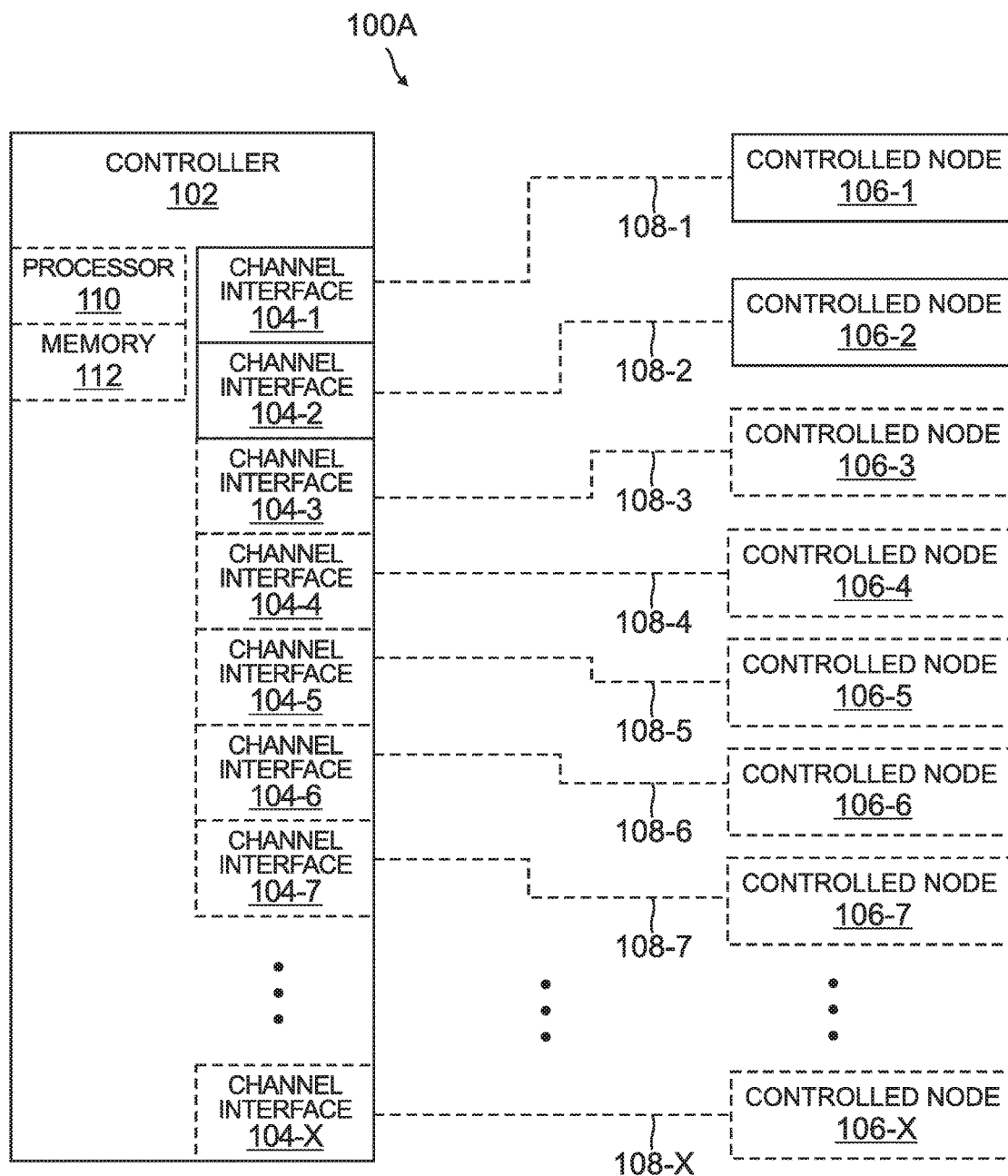
FIGS. 1A-1C are block diagrams of exemplary embodiments of systems for connecting controlled nodes to a controller.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In exemplary embodiments, at least one controller is connected to a plurality of controlled nodes using a plurality of point to point communication links. In exemplary embodiments, the at least one controller is connected to the plurality of controlled nodes using cabled media (such as conductive wired media and/or fiber optic media). In other embodiments, the at least one controller is connected to the plurality of controlled nodes using wireless communication. In exemplary embodiments, at least some of the plurality of controlled nodes receive communication from the controller intended for other controlled nodes of the plurality of controlled nodes. In exemplary embodiments where the at least one controller includes a plurality of ports, each communicatively coupled to one of the plurality of controlled nodes. In exemplary embodiments, both the intended recipient controlled node and at least one additional controlled node of the plurality of controlled nodes receive the same communication from the at least one controller. In exemplary embodiments, this is caused by crosstalk on communication media between the at least one controller and the intended recipient control node and the at least one additional controlled node of the plurality of controlled nodes.

In exemplary embodiments utilizing wireless communication between the at least one controller and the plurality of controlled nodes, a plurality of controlled nodes communicate with the controller using spectrum for a single wireless channel, such that each of the plurality of controlled nodes receives communication intended for it as well as the other controlled nodes of the plurality of controlled nodes. In exemplary embodiments, the plurality of controlled nodes includes eight controlled nodes. In exemplary embodiments, beam forming is used to create point to point directional wireless communication between the at least one controller and the plurality of controlled nodes. In exemplary embodiments, even with the directional wireless communication, side lobes and other non-zero amounts of power extend in other directions such that even with beam forming, there is still some amount of power extending in other directions.

In exemplary embodiments, the at least one controller communicates with the plurality of controlled nodes over cabled media (such as category cable (such as Ethernet cabling), coaxial cable, twisted pair, optical fiber, other conductive wired media, other optical cabled media, etc.). In exemplary embodiments, the cabled media are bundled up tightly in a cable management system. In exemplary embodiment, the tight bundling introduces cross talk between the cabled media. In exemplary embodiments, whether wireless or cabled, some amount of cross communication occurs causing a plurality of controlled nodes to be able to receive messages from a plurality of channels from the controller.

Exemplary embodiments enable pairing-up the controlled nodes with the at least one controller during a discovery process. In exemplary embodiments, multiple controllers are paired up as having the strongest signal-coupling with multiple controlled nodes such that each controlled node is synched up with a controller across an individual channel. In exemplary embodiments, the paring occurs based on a determination of which channel interfaces of the controlled nodes are most strongly signal-coupled with which controlled nodes. Signal-coupling follows the path which signals from channel interfaces of the controlled node travel along to one or more controlled nodes. Signal-coupling does not require physical and/or intentional coupling between the channel interfaces of the controlled node and the one or more controlled nodes and can occur based on cross communication between the channels.

In exemplary embodiments, each controller is communicatively coupled to a corresponding controlled node across a control channel. In exemplary embodiments, the controller is a host unit in a distributed antenna system (DAS) and the controlled nodes are remote units in the distributed antenna system (DAS). In exemplary embodiments, the distributed antenna system (DAS) includes point to multipoint communication (simulcast) in either the downstream or the upstream, but the control channel between each controller and each corresponding controlled node includes a unique control channel point to point connection.

Figure 1B:
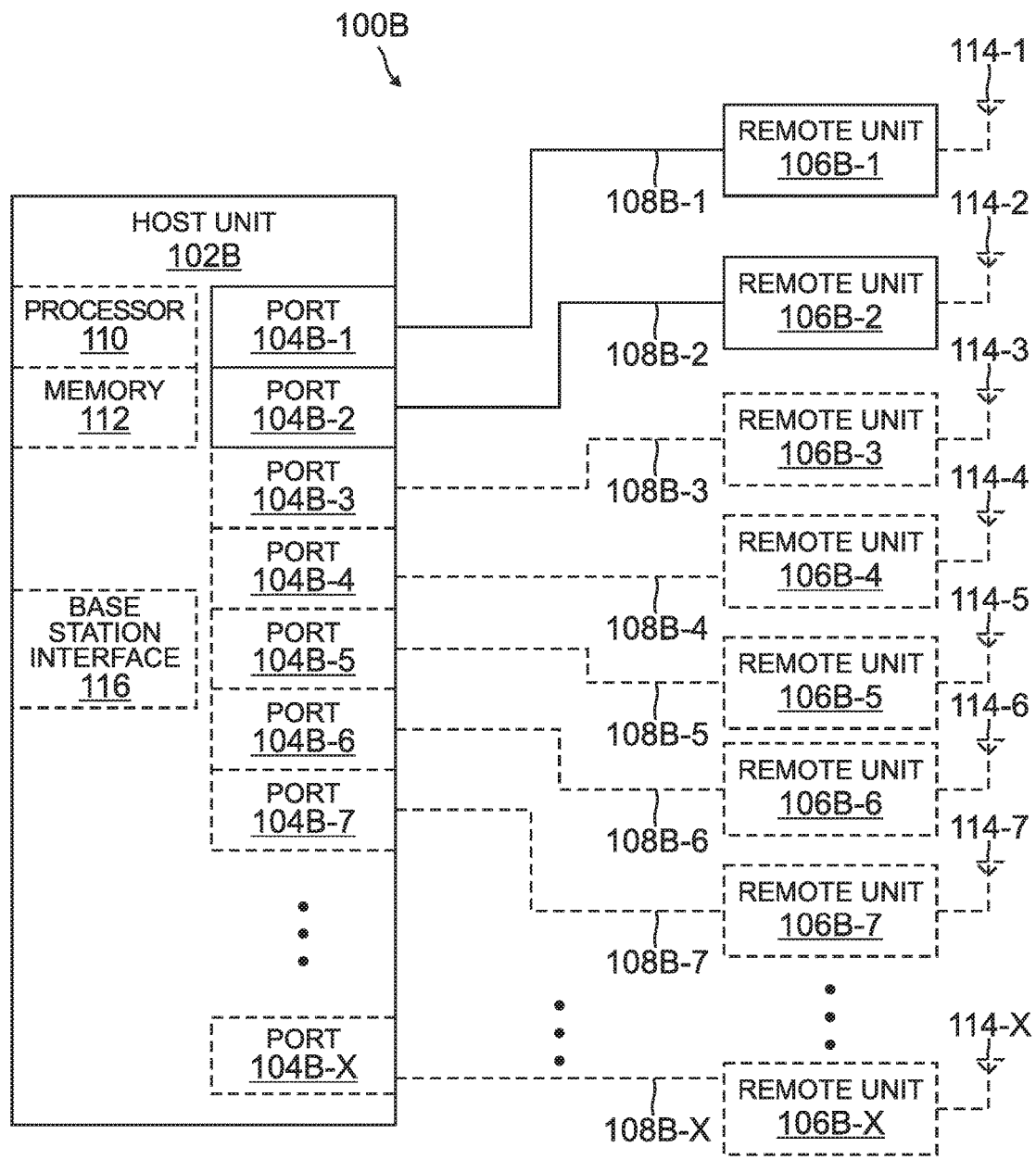
Figure 1C:
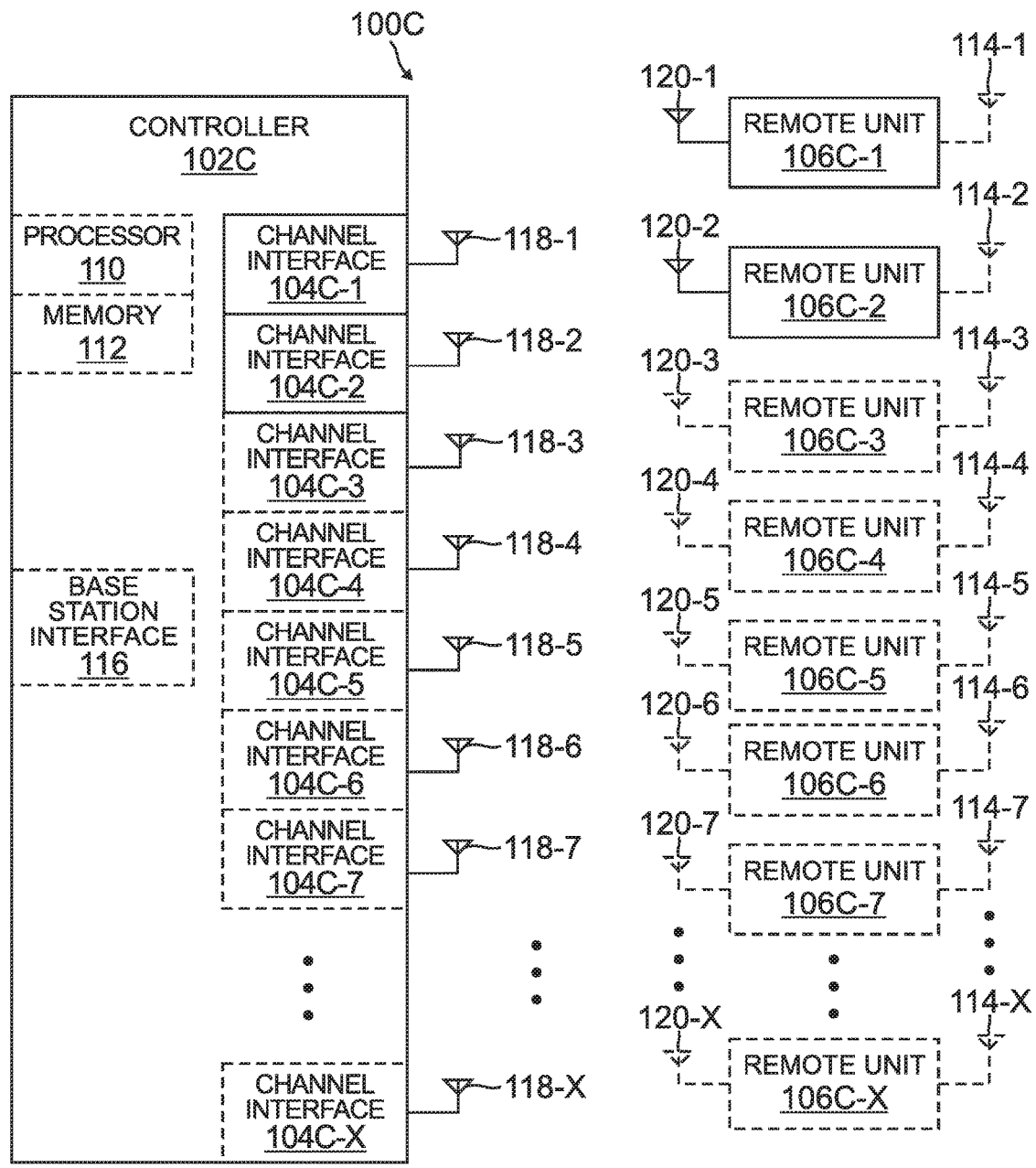

FIGS. 1A-1C are block diagrams of exemplary embodiments of systems 100 for connecting controlled nodes 106 to a controller 102. Each of FIGS. 1A-1C illustrates a different embodiment of a system 100, labeled 100A-100C respectively.

FIG. 1A is a block diagram of an exemplary embodiment of a system 100A for connecting controlled nodes 106 to a controller 102. System 100A includes at least one controller 102 having a plurality of channel interfaces 104 (such as channel interface 104-1, channel interface 104-2, and any quantity of optional channel interfaces 104, such as optional channel interface 104-3 through optional channel interface 104-X). System 100A includes a plurality of controlled nodes 106 (such as controlled node 106-1, controlled node 106-2, and any quantity of optional controlled nodes 106, such as optional controlled node 106-3 through optional controlled node 106-X) each coupled to a channel interface 104 of the controller 102 by a channel 108 (such as channel 108-1, channel 108-2, and any quantity of optional channels 108, such as optional channel 108-3 through optional channel 108-X). While one controller 102, eight channel interfaces 104, eight controlled nodes 106, and eight channels 108 are shown in FIG. 1A, exemplary embodiments have greater or fewer controllers 102, channel interfaces 104, controlled nodes 106, and channels 108.

In exemplary embodiments, the controller 102 includes optional processor 110, optional memory 112, and/or other circuitry for implementing functionality as described herein. In exemplary embodiments, the controlled nodes 106 also include processors, memory, and/or other circuitry for implementing functionality as described herein. In exemplary embodiments, the processor 110 in the controller 102 and/or processors in the controlled nodes 106 are programmable processors, such as a microcontroller, an application-specific integrated circuit (ASIC), a field-programmable gate array (FPGA), a field-programmable object array (FPOA), or a programmable logic device (PLD). Any of the processor 110 and/or processors in the controlled nodes 106 described above may include or function with software programs, firmware or other computer readable instructions for carrying out various methods, process tasks, calculations, and control functions, described herein. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, the channels 108 are across cabled media, such as category cables (such as Ethernet cables), coaxial cables, optical fibers, twisted pair, other conductive wired media, and other optical cabled media. In exemplary embodiments where the channels 108 are across cabled media, the cabled media are bundled together and there is cross talk between a plurality of the cabled media causing the communication signals going down at least one of the cabled media (such as channel 108-1) to couple into at least one of the other cabled media (such as channel 108-2), so that the controlled nodes 106 communicatively coupled to the at least one other cabled media (such as channel 108-2) also receive the communication signals traveling down the at least one of the cabled media (such as channel 108-1). In exemplary embodiments where the cross talk is present, the communication signal couples into a plurality of the other cabled media (such as channel 108-2) such that a plurality of the controlled nodes 106 (such as any of controlled node 106-2 through controlled node 106-X and up to all the controlled nodes 106) not directly coupled to the cabled media in which the communication signal is traveling also receive the communication signal.

In exemplary embodiments, the channels 108 are across wireless media and are transmitted using electromagnetic radiation, such as radio frequency signals, free space optical signals, etc. In exemplary embodiments where the channels 108 are across wireless media (an open environment), at least one transmitter sends a communication signal across a wireless media (such as channel 108-1), which is not only received by the intended controlled node 106 (such as controlled nodes 106-1) but also by at least one unintended additional controlled node 106 (such as any of controlled node 106-2 through controlled node 106-X). In exemplary embodiments, the plurality of channel interfaces 104 are transmitters that wireless send communication directed to specific controlled nodes 106 across the channels 108, that are received by other controlled nodes 106 that are not the intended recipient controlled nodes 106.

In exemplary embodiments, whether the channels 108 are across cabled or wireless media, techniques are used to determine which controlled nodes 106 is most strongly signal-coupled to which channel interface 104 based on the signal strength across the channels 108. In exemplary embodiments, multiple controlled nodes 106 receive a signal from a single channel interface 104 intended for a single controlled node 106. In exemplary embodiments, at least one controlled node 106 receives signals from the single channel interface 104 of a higher signal strength and/or quality than the other controlled nodes 106. In exemplary embodiments, the controlled nodes 106 are paired up as having the strongest signal-coupling with the channel interfaces 104 based on which connections have the highest signal strength. In exemplary embodiments, where two of the connections have equally strong signal strength, one pair is selected to be paired up as having the strongest signal-coupling. In exemplary embodiments, it is not relevant how the controlled nodes 106 are actually intended to be communicatively coupled to the channel interfaces 104, just where the strongest signal strength is found. Thus, even if the highest signal strength occurs between a controlled node 106 and a channel interface 104 that aren't actually intended to be communicatively coupled, that controlled node 106 and channel interface 104 are paired up as having the strongest signal-coupling because the actual signal strength is strongest. In exemplary implementations, this isn't a problem because the controlled node 106 receives the communication signals from the channel interface 104 just as strongly or stronger than if it were paired in the intended way. In exemplary embodiments where the coupling of signals between the channel 108-1 into channel 108-2 is so tight, there is really no difference in the signal power and the communication signals are completely coupled over from channel 108-1 to channel 108-2 and it does not matter that channel 108-1 is actually controlling controlled node 106-2. In exemplary embodiments where the coupling of signals between the channel 108-2 into channel 108-1 is so tight, there is really no difference in the signal power and the communication signals are completely coupled over from channel 108-2 to 108-1 and it does not matter that channel 108-2 is actually controlling controlled node 106-1. In exemplary embodiments, this is acceptable as long as the controlled node 106-1 and the controller 102 can still communicate.

In exemplary embodiments, the techniques described herein provide for periodically reassessing the same point to point link because it may change over time. In a wireless environments, it can change over time because a truck (or other vehicle) might have been positioned in such a place that it caused some reflections or overlap of side lobes of the signal with other channels 108 in ways that caused the channels 108 to couple into each other more, but then later the truck moves and the channels interact less or in other ways causing the signal strengths to change over time. In cabled environments, the cabled connections may have been disconnected and reconnected in a different way so that they are no longer coupling in the same way and should be reassessed. In exemplary embodiments, the signal strengths are reassessed periodically to account for changes in the network based on changes in the physical connections and/or the environment. In exemplary embodiments, connections are added or removed at any time and/or conditions may change so that bundling of cabled media may change. In exemplary embodiments, cabled media could be pulled apart and/or replaced. In exemplary embodiments, wireless antennas are replaced.

Accordingly, it is desirable that the signal strengths be reassessed often to account for changes in the network and capture additions and/or removals of controlled nodes 106.

In exemplary embodiments, the periodicity of the rediscovery process is limited by the hardware and/or network. In some implementations, the processing power of the processors in the controller 102 and/or controlled nodes 106 impact the periodicity. In some implementations, the BAUD rate of the channel interface 104 and the interface on the controlled nodes 106 (such as transmitter and/or receivers) and/or what the maximum wait time is for a message to travel between the controller 102 and the controlled nodes 106 can impact the periodicity.

In exemplary embodiments, the periodicity of the rediscovery process is limited by other communications across the control channel done during the remainder of the period. In exemplary implementations, commissioning values and other data are transmitted across the control channel when a new controlled node 106 is connected to the controller 102. In some implementations, this is a relatively low volume of data and has little impact on the periodicity. In other implementations, it is a higher volume of data and has a greater impact on the periodicity. In exemplary embodiments, the time duration it takes to send data between the controller 102 and the controlled nodes 106, how many messages need to be sent from the controller 102 and the controlled node 106, the size per message (for example in bytes), and/or how long it takes to send all of the messages impact the periodicity.

In exemplary embodiments, the reassessment is performed both periodically and on an accelerated basis. In exemplary embodiments, events trigger acceleration of the reassessment. For example, the controller 102 may use other data to determine that a new controlled node 106 has been added and/or that a controlled node 106 has been removed. In exemplary embodiments, the controller 102 is providing power to the controlled nodes 106 and senses when a controlled node 106 is added and power is being provided and/or removed and power is no longer being provided and accelerates the rediscovery process accordingly. In exemplary embodiments implementing a wireless network, a wireless broadcast beacon may be provided from a new controlled node 106 indicating that the discovery should be accelerated so that it can be added to the network. In exemplary embodiments, detection of a large number of collisions would cause the controller 102 to accelerate the rediscovery. In exemplary embodiments, other events cause acceleration of the rediscovery.

In exemplary embodiments using cabled media, cross-talk between the cabled media causes the communication signals to be received at the other controlled nodes 106. While this doesn't seem like it should be a problem because there is point to point cabled communication between individual channel interfaces 104 and the individual controlled nodes 106 (particularly places where cross-talk suppression may already be done, such as with shielding or electronically at the PHY level in an Ethernet system), embodiments have this problem. For example, if the communication signals sent from the individual channel interfaces 104 to the individual controlled nodes 106 are modulated waveforms across twisted pair channels 108, it is not immune to cross-talk from other cables 108 from other frequencies and does not lend itself to physically or electronically suppressing cross-talk.

In exemplary embodiments using wireless media for the channels 108, the cross-communication between channels 108 also causes communication intended for one controlled node 106 across one channel 108 to couple into another channel 108 and be received by another controlled node 106. In exemplary embodiments, the controller 102 does not receive a broadcast message from a controlled node 106, so it doesn't know that the controlled node 106 is there unless it initiates the discovery process in the first place. In exemplary embodiments using wireless media for the channels 108, the controller 102 only includes a single transmitter that sends out one channel interface 104 or another channel interface 104 depending on the intended recipient controlled node 106. In exemplary embodiments, the channel interfaces 104 are connected to an antenna array where there is only one transceiver that switches between various antennas of the antenna array. In exemplary implementations, the antenna array includes a number of directional antennas pointing in various directions. In exemplary embodiments, even if a controlled node 106 announces its presence to the host, the host may be tuned to a different channel interface 106 receiving a channel 108 from a different direction and wouldn't receive the announcement from the announcing controlled node 106 at that time. In exemplary embodiments, it is statistically unlikely to have the correct channel interface 104 of the controller 102 active at the correct time to receive presence announcements from controlled nodes 106. This is especially true as the quantity of controlled nodes 106 and channel interfaces 104 to cycle through increases. Accordingly, the controller 102 initiates all communication with the controlled nodes 106.

In exemplary embodiments, the controller 102 is configured to send a clear channel power reading signal on each channel interface 104 across a corresponding channel 108 toward a controlled node 106. In exemplary embodiments, each controlled node 106 that receives the clear channel power reading signal responds by clearing any prior measured channel power readings stored at the particular controlled node 106. In exemplary embodiments, each controlled node includes a list/table that includes the communication channel power of every channel interface 104 that exists in the controller 102. In exemplary embodiments, the prior measured channel power readings are cleared by placing a default large negative number into them. Accordingly, if this value is not changed later on for a particular channel interface 104, it is understood that there was no power on the communication channel for that particular channel interface 104. In exemplary embodiments, the table/list includes a value for each of the channel interfaces 104-1 through 104-X and each of them are cleared/reset to the default negative value, meaning power has not yet been detected on this channel during this iteration of the discovery loop. In exemplary embodiments, by clearing out the power levels to the default value, each of the controlled nodes 106 start effectively with a blank slate with no stale numbers from prior discovery request which could be inaccurate because something about the network topology and/or environment has changed (such as moving of the bundles of cabled communication media 108, movement of vehicles within a wireless communication media 108 environment causing different reflections). In exemplary embodiments, no acknowledgement response is sent from each controlled node 106 that receives the clear channel power reading signal to the relevant channel interface 104. In other exemplary embodiments, an acknowledgement response is sent.

In exemplary embodiments, the controller 102 is configured to send a measurement request signal on each channel interface 104 across a corresponding channel 108 toward a controlled node 106. In exemplary embodiments, each controlled node 106 that receives a measurement request signal for a particular channel interface 104 takes at least one measurement of the communications channel power for that particular channel interface 104 and stores the communications channel power locally at the particular controlled node 106. In exemplary embodiments, the at least one measurement of the communications channel power includes a plurality of distinct measurements (such but not limited to three distinct measurements). In exemplary embodiments, any of the controlled nodes 106 may receive communications from more than one channel interface 104 because of cross-talk or other coupling of the communications signals between the channels 108.

In exemplary embodiments, each channel interface 104 identifies itself in the measurement request signal such that any controlled node 106 receiving the measurement request signal can identify which channel interface 104 the particular measurement request signal is originating from. In exemplary embodiments, from the perspective of the controlled nodes 106, the communication received is identified by a first channel interface 104 (such as channel interface 104-1), even though it may actually be physically connected by a cabled media with a second channel interface 104 (such as channel interface 104-2) or physically located so that a directional antenna should be using a wireless channel 108-2 physically connected to a wireless second channel interface 104 (such as channel interface 104-2).

In exemplary embodiments each controlled node 106 maintains a list/table of the communications channel power for each channel 108. In exemplary embodiments, a controlled node 106 does not receive the measurement request signal from a particular channel interface 104. In exemplary embodiments, when a controlled node 106 does not receive the measurement request signal from a particular channel interface 104, the value for that communication channel 108 power will remain at the default value to indicate that no communication was received for that channel interface 104. In exemplary embodiments, once the controller 102 sends a measurement request signal using each channel interface 104, any controlled nodes 106 that received a measurement request signal from any of the channel interfaces 104 will have taken and stored communications channel power data for any particular channel interface 104 it received a measurement request signal from.

In exemplary embodiments, while a signal may be received, it may be desirable that signals with low enough power levels be ignored as effectively not received. Accordingly in exemplary embodiments, a threshold power level is used to determine whether or not it is considered that the communications channel power data was received. In exemplary embodiments, if the communications channel power level falls below the threshold, the default value will remain in the table/list for that particular channel interface 104. In exemplary embodiments, because of the possibility of cross-talk and/or other coupling between the channels 108, there are going to be situations where more than one controlled node 106 receives the communication from a single channel interface 104. In wireless channel 108 embodiments, any given controlled node 106 might have two or more entries from different channel interfaces 104 because of cross-talk from adjacent channels particularly in embodiments without beam-forming where in a worst case scenario a single controlled node 106 may be receiving communication signals from all of the channel interfaces 104. Even in the best case scenario where there is no cross-talk and/or other types of channel coupling 108, the methodologies described herein provide a way of automatically determining which channel interface is communicatively coupled to which controlled node 106. While it is transmitted from the single channel interface 104 toward a single controlled node 106, the cross-talk and/or other channel coupling causes the signal to couple from one channel 108 to another channel 108 such that two controlled nodes 106 receive the signal.

In exemplary embodiments and after the measurement request signal is sent on each channel interface 104, a power level request signal is communicated for each channel interface 104 requesting that any controlled node 106 that receives the power level request signal send its set of communication channel power measurements for each of the channel interfaces 104 back to the controller 102. In exemplary embodiments, each controlled node sends the response to the power level request signal after a random delay to avoid collisions due to multiple controlled nodes 106 receiving the measurement request signal across two different channels 108 at the same time (based on cross-talk and/or other coupling between the channels) and/or messages of approximately the same length. In exemplary embodiments, the random delay methodology may include a random back-off and retry method to maximize the receipt of the signal.

In exemplary embodiments, each controlled node 106 includes a unique identifier (such as a serial number) to identify its responsive communication to the measurement request signal to the controller 102. The controller 102 then stores the list/table of the communications channel power for each channel 108 locally. By sending the measurement request signal on each channel interface 104, the controller 102 ensures that it receives the communication channel power measurement for each controlled node 106 that can communicate with any of the channel interfaces 104 of the controller 102, regardless of whether cross-talk and/or other coupling between the channels 108 occurs.

In exemplary embodiments, one or more controlled nodes 106 sends multiple responses to multiple power level request signals received from a plurality of channel interfaces 104. In exemplary embodiments, the data should be the same because no measurement updates have occurred in between the series of measurement request signals. In exemplary implementations, the controller 102 just overwrites the received from a particular controlled node 106 each time it arrives because it should be the same. In other exemplary implementations, the controller 102 only writes the data received from a particular controlled node 106 one time per discovery and assignment cycle so that once it has been filled in, it doesn't save the overwrite with the same data again.

In exemplary embodiments and after waiting to receive the communication channel power measurement for each controlled node 106 that receives the measurement request signal from any channel interface 104, the controller 102 performs an analysis of the received communication channel power measurement values from all of the controlled nodes 106 to assign each controlled node 106 to a channel interface 104 based on the highest communication channel power measurement values for that particular channel interface 104. In exemplary embodiments, if more than one communication channel power measurement value of more than one controlled node 106 for a particular channel interface 104 are both approximately the same highest power, data on previous assignments of the controlled nodes 106 to the channel interfaces 104 can be used to make an informed selection and/or one of the controlled nodes 106 can be selected to be assigned to the particular channel interface 104 randomly. In exemplary embodiments, the controller 102 makes the determination of which channel interface 104 is most probably connected to which controlled node 106 in other ways and/or the assignment of which channel interface 104 is deemed communicatively coupled to which controlled node 106 in other ways.

In exemplary embodiments, the controller 102 then communicates the channel interface 104 assignment message to each discovered controlled node 106 along with its unique identifier (such as a serial number) in order to assign each to its own channel interface 104. In exemplary embodiments, by allowing for controlled nodes 106 to be assigned to channel interfaces 104 based on their signal strength, it may be that a controlled node 106 is assigned to a channel interface 104 to which it is not physically connected. In exemplary embodiments this has the advantage of allowing the highest strength signals to be sent between the controller and to the controlled node 106, even if it is not what would be logical based on the physical topology of the network of channels 108. Periodic rediscovery addresses the potential change of the highest signal strength topology with time. In exemplary embodiments, the periodic re-discovery accordingly to the described methodology enables the highest strength signals to be sent between the controller 102 and the controlled node 106.

In exemplary embodiments, once discovery has occurred, messages will be communicated between the controller and controlled node 106 across a channel interface 104 and will include a channel interface 104 identifier (such as the serial number or other unique identifier). In exemplary embodiments, even though a controller 102 is switched to a particular channel interface 104 when transmitting (which should result in the highest signal strength being received at the desired controlled node 106), other controlled nodes 106 may also receive the transmitted communication based on the cross-talk and/or other types of coupling between the channels 108. By providing the channel interface 104 identifier for the channel interface 104 currently transmitting, the controlled node 106 assigned to the particular channel interface 104 can selectively receive the communication. Any other controlled nodes 106 receiving the communication that are not assigned to the particular channel interface 104 can electively ignore the communication based on the channel interface 104 identifier. In exemplary embodiments, sequence numbers can also be sent with the communication to help ensure correct order of communication between the controller 102 and the controlled nodes 106.

Accordingly, once the initial discovery and assignment of controlled nodes 106 to channel interfaces 104 is completed, the channel interface 104 identifier may be included with communication between the controller 102 and the controlled nodes 106. The unique identifier of the destination controlled nodes 106 does not need to be included as the assumption is that the best channel has been selected based on the discovery and assignment. Upon the periodic and/or accelerated rediscovery and assignment of the controlled nodes 106, the unique identifier of the destination controlled nodes 106 would again be used as part of the rediscovery and assignment process. Still, in exemplary embodiments, the unique identifier (such as a serial number) may be of interest from an inventory standpoint and/or for an audit of the system and it can also be communicated during the regular communication if desired.

As described above and in exemplary embodiments, rediscovery can be periodic, but it can also be accelerated based on various events and for various reasons. For example, rediscovery can be accelerated when a device is added to or removed from a network. In exemplary embodiments where the communication channels 108 are across cabled media that also provide power from the controller 102 to the controlled nodes 106, this can be sensed when power begins to be supplied to a newly added controlled node 106 or when power is no longer supplied to a removed controlled node 106. In exemplary embodiments, acceleration of the rediscovery and reassignment can occur when there are a high number of collisions of data communicated between on one or more of the channel interfaces 104 and the controlled nodes. In exemplary embodiments, acceleration of rediscovery and reassignment can occur if there is loss of communication between a particular channel interface 104 and its assigned controlled node 106. Loss of communication could occur if cables are reassembled into a bundle in implementations where the communication channels 108 are across cabled media or where an object has moved in implementations where the communication channels 108 are for wireless communication. In exemplary embodiments where the communication channels 108 are wireless, beacons signals from the controlled nodes 106 indicating that a new controlled node 106 is available may be used to accelerate the rediscovery and reassignment. In exemplary embodiments, input from a user may be used to accelerate the rediscovery and reassignment. For example, a user may press a button on a graphical user interface (GUI) or a physical button on the controller 102 and/or controlled node 106 that causes the rediscovery and reassignment process to be accelerated when the user is aware that something has changed and the acceleration of the rediscovery and/or reassignment is desirable.

In exemplary embodiments, the discovery and assignment and/or rediscovery and reassignment does not affect the service and does not actually bring the links down. In other systems, discovery may only be able to be done when a controlled node 106 is power cycled so that the controller 102 can see that a controlled node 106 needs to be discovered. In exemplary embodiments, if a plurality of channel interfaces 104 to controlled node 106 connections are swapped because the power level is stronger on one than the other, it doesn't really impact the controlled nodes 106 because they still receive the communication strongly.

In exemplary embodiments, once communication is established there are unique identifiers for the controlled nodes 106, channel interfaces 104, and/or controller 102. A unique identifier, such as a serial number or other unique identifier, can aid in pairing up particular channel interfaces 104 on the controller 102 with controlled nodes 106. In exemplary embodiments, the particular channel interface 104 can essentially send a discovery message to the controlled nodes 106, which then respond with an indication that they received the discovery message and on which port they received the discovery message. The controller 102 will have received unique identifiers (such as serial number) and an indication of received power from the controlled nodes 106. The controller 102 can then make determinations as to which channel interface 104 each controlled node 106 is signal-coupled to. Then, each controlled node 106 is instructed by the controller to only respond to messages specifically directed to a particular channel interface 104. Even though controlled nodes 106 may receive messages from a plurality of channel interfaces 104, each controlled node 106 will ignore the messages for the other channels other than the channel to which they have been assigned.

FIG. 1B is a block diagram of an exemplary embodiment of a specific embodiment of system 100A, cabled distributed antenna system 100B. Distributed antenna system (DAS) 100B includes at least one host unit 102B having a plurality of ports 104B (such as port 104B-1, port 104B-2, and any quantity of optional port 104B-3 through optional port 104B-X). DAS 100B includes a plurality of remote units 106B (such as remote unit 106B-1, remote unit 106B-2, and any quantity of optional remote unit 106B-3 through optional remote unit 106B-X) each coupled to a port 104B of the host unit 102B by a channel across a cabled media 108B (such as cabled medium 108B-1, cabled medium 108B-2, and any quantity of optional cabled medium 108B-3 through optional cabled medium 108B-X). While one host unit 102B, eight ports 104B, eight remote units 106B, and eight cabled media 108B are shown in FIG. 1B, exemplary embodiments have greater or fewer host units 102B, ports 104B, remote units 106B, and cabled media 108B.

In exemplary embodiments, the host unit 102B includes optional processor 110, optional memory 112, and/or other circuitry for implementing functionality as described herein. In exemplary embodiments, the remote units 106B also include processors, memory, and/or other circuitry for implementing functionality as described herein. In exemplary embodiments, the processor 110 in the host unit 102B and/or processors in the remote units 106B are programmable processors, such as a microcontroller, an application-specific integrated circuit (ASIC), a field-programmable gate array (FPGA), a field-programmable object array (FPOA), or a programmable logic device (PLD). Any of the processor 110 and/or processors in the remote units 106B described above may include or function with software programs, firmware or other computer readable instructions for carrying out various methods, process tasks, calculations, and control functions, described herein.

In exemplary embodiments, the host unit 102B functions similarly to controller 102, the ports 104B function similarly to channel interfaces 104, the remote units 106B function similarly to controlled nodes 106, and the cabled media 108B function as cabled embodiments of the channels 108 described above. In exemplary embodiments, each remote unit 106B further includes an optional antenna 114 (such as optional antenna 114-1 through optional antenna 114-X) used for communicating signals with wireless subscriber units. In exemplary embodiments, the host unit 102B includes an optional base station interface 116 for communicating with a base station. In exemplary embodiments, the host unit 102B interfaces with a base station through the optional base station interface 116 using any combination of digital, analog, baseband, intermediate frequency, and/or radio frequency signals.

FIG. 1C is a block diagram of an exemplary embodiment of a specific embodiment of system 100A, wireless system 100B. Wireless system 100C includes at least one host unit 102C having a plurality of channel interfaces 104C (such as channel interface 104C-1, channel interface 104C-2, and any quantity of optional channel interface 104C-3 through optional channel interface 104C-X). Wireless system 100C includes a plurality of remote units 106C (such as remote unit 106C-1, remote unit 106C-2, and any quantity of optional remote unit 106C-3 through optional remote unit 106C-X) each coupled to a channel interface 104C of the host unit 102C by a wireless channel using antennas 118 (such as antenna 118-1, antenna 118-2, and any optional antenna 118-3 through antenna 118-X) coupled to the channel interfaces 104C and antennas 120 (such as antenna 120-1, antenna 120-2, and any optional antenna 120-3 through antenna 120-X) coupled to the remote units 106C. While one host unit 102C, eight channel interfaces 104C, eight remote units 106C, eight antennas 118 and eight antennas 120 are shown in FIG. 1C, exemplary embodiments have greater or fewer host units 102C, channel interfaces 104C, remote units 106C, antennas 118, and antennas 120.

In exemplary embodiments, the host unit 102C includes optional processor 110, optional memory 112, and/or other circuitry for implementing functionality as described herein. In exemplary embodiments, the remote units 106C also include processors, memory, and/or other circuitry for implementing functionality as described herein. In exemplary embodiments, the processor 110 in the host unit 102C and/or processors in the remote units 106C are programmable processors, such as a microcontroller, an application-specific integrated circuit (ASIC), a field-programmable gate array (FPGA), a field-programmable object array (FPOA), or a programmable logic device (PLD). Any of the processor 110 and/or processors in the remote units 106C described above may include or function with software programs, firmware or other computer readable instructions for carrying out various methods, process tasks, calculations, and control functions, described herein.

In exemplary embodiments, the host unit 102C functions similarly to controller 102, the channel interfaces 104C in FIG. 1C function similarly to channel interfaces 104 in FIG. 1A, the remote units 106C function similarly to controlled nodes 106, and the communication channels between the antennas 118 and antennas 120 function as wireless embodiments of the channels 108 described above. In exemplary embodiments, each remote unit 106C further includes an optional antenna 114 (such as optional antenna 114-1 through optional antenna 114-X) used for communicating signals with wireless subscriber units. In exemplary embodiments, the host unit 102C includes an optional base station interface 116 for communicating with a base station. In exemplary embodiments, the host unit 102C interfaces with a base station through the optional base station interface 116 using any combination of digital, analog, baseband, intermediate frequency, and/or radio frequency signals.

Figure 2:
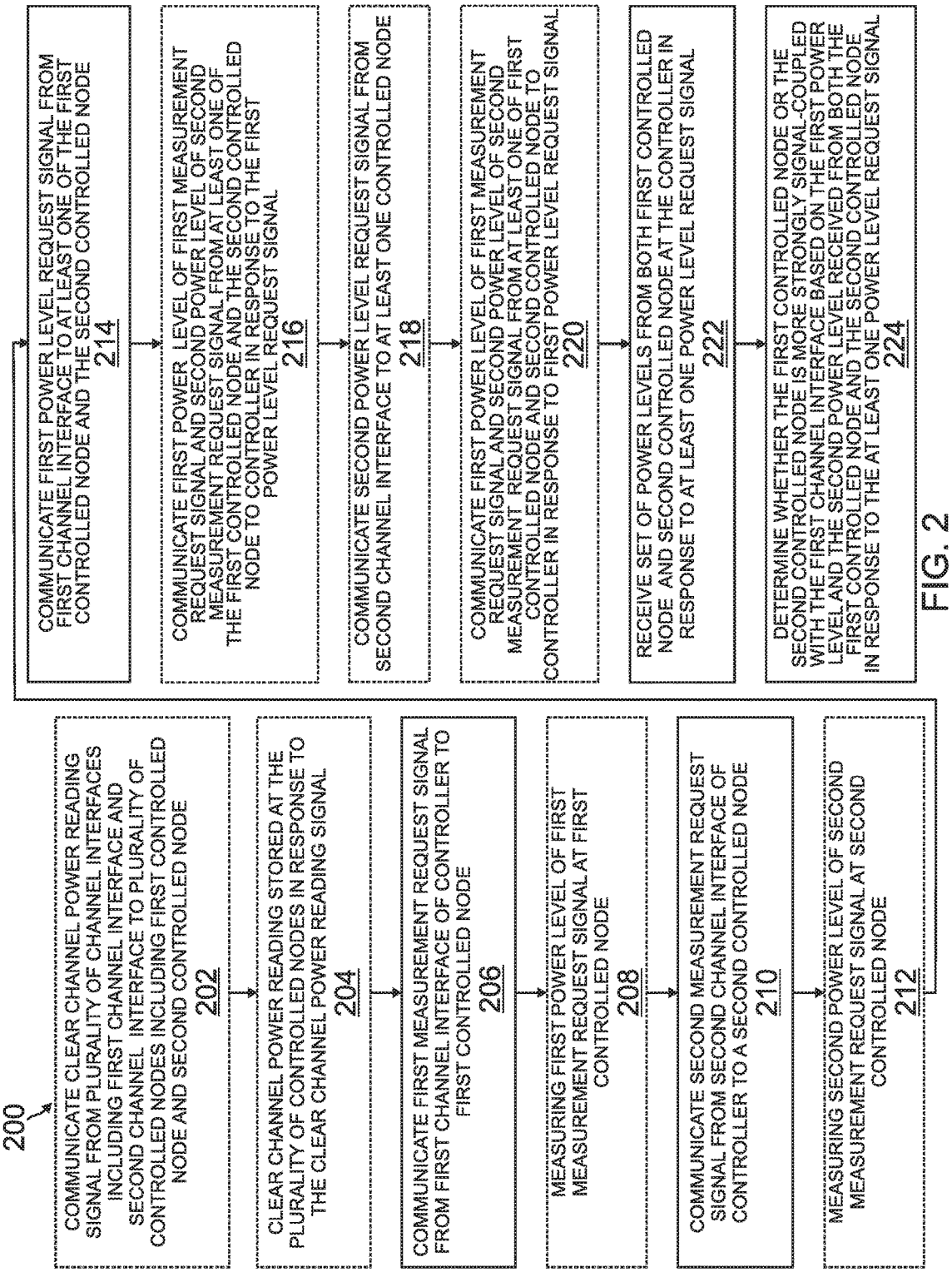
FIG. 2 is a flow diagram illustrating an exemplary embodiment of a method for connecting controlled nodes to a controller.

FIG. 2 is a flow diagram illustrating an exemplary embodiment of a method 200 for connecting controlled nodes to a controller. In exemplary embodiments, the method 200 begins at optional block 202 with communicating a clear channel power reading signal from a plurality of channel interfaces including a first channel interface and a second channel interface to a plurality of controlled nodes including a first controlled node and a second controlled node. In exemplary embodiments, the clear channel power reading signal instructs any of the plurality of controlled nodes that receive it to clear the channel power readings stored at each of the plurality of controlled nodes. In exemplary embodiments, the channel power readings at each of the plurality of controlled nodes include channel power readings for each of a plurality of channels intended as a channel between one of the plurality of channel interfaces and one of the plurality of controlled nodes. In exemplary embodiments, the clear channel power reading signal is communicated from each channel interface of the plurality of channel interfaces to any controlled node of the plurality of controlled nodes that receives the clear channel power reading signal.

In exemplary embodiments, the method 200 proceeds to optional block 204 with clearing the channel power readings stored at the plurality of controlled nodes in response to the clear channel power reading signal. In exemplary embodiments, the clear channel power reading signal is received from at least one of the plurality of channel interfaces at each of the plurality of controlled nodes. In exemplary embodiments, the clear channel power reading signal is received from more than one of the plurality of channel interfaces at at least one of the plurality of controlled nodes. In exemplary embodiments, the channel power reading that are cleared include channel power reading for a plurality of channels, each of the plurality of channels intended as a channel between one of the plurality of channel interfaces and one of the plurality of controlled nodes.

The method 200 proceeds to block 206 with communicating a first measurement request signal from a first channel interface of a plurality of channel interfaces of a controller to a first controlled node of a plurality of controlled nodes. In exemplary embodiments, the first measurement request signal is communicated from the first channel interface to any of the plurality of controlled nodes that receive it (including controlled nodes that are not intended to be recipients that receive the first measurement request signal through cross-talk and other types of coupling between the channels). In exemplary embodiments, method 200 proceeds to optional block 208 with measuring the first power level of the first measurement request signal at the first controlled node. In exemplary embodiments, the first power level of the first measurement request signal is measured at any of the plurality of controlled nodes that had received the first measurement request signal.

Method 200 proceeds to block 210 with communicating a second measurement request signal from a second channel interface of the plurality of channel interfaces of the controller to a second controlled node of the plurality of controlled nodes. In exemplary embodiments, the second measurement request signal is communicated from the second channel interface to any of the plurality of controlled nodes that receive it (including controlled nodes that are not intended to be recipients that receive the second measurement request signal through cross-talk and other types of coupling between the channels). In exemplary embodiments, method 200 proceeds to optional block 212 with measuring the second power level of the second measurement request signal at the second controlled node. In exemplary embodiments, the second power level of the second measurement request signal is measured at any of the plurality of controlled nodes that had received the second measurement request signal.

Method 200 proceeds to block 214 with communicating a first power level request signal from the first channel interface to at least one of the first controlled node and the second controlled node. In exemplary embodiments, the first power level request signal is received by any of the plurality of controlled nodes that receive it (including controlled nodes that are not intended to be recipients that receive the first power level request signal through cross-talk and other types of coupling between channels). In exemplary embodiments, the first power level request signal is received by both the first controlled node and the second controlled node. In other exemplary embodiments, the first power level request signal is received by the first controlled node, but not by the second controlled node. In other exemplary embodiments, the first power level request signal is received by the second controlled node, but not by the first controlled node.

In exemplary embodiments, method 200 proceeds to optional block 216 with communicating both the first power level of the first measurement request signal and the second power level of the second measurement request signal from the at least one of the first controlled node and the second controlled node to the controller in response to the first power level request signal. In exemplary embodiments where both the first controlled node and the second controlled node received the first power level request signal from the controller, the first controlled node communicates its first power level and second power level and the second controlled node communicates its first power level and second power level to the controller in response to the first power level request signal. In exemplary embodiments where the first controlled node received the first power level request signal from the controller while the second controlled node did not receive the first power level request signal from the controller, the first controlled node communicates its first power level and second power level to the controller in response to the first power level request signal, while the second controlled node does not. In exemplary embodiments where the second controlled node received the first power level request signal from the controller while the first controlled node did not receive the first power level request signal from the controller, the second controlled node communicates its first power level and second power level to the controller in response to the first power level request signal, while the first controlled node does not.

In exemplary embodiments, method 200 proceeds to optional block 218 with communicating a second power level request signal from the second channel interface to at least one of the first controlled node and the second controlled node. In exemplary embodiments, the second power level request signal is received by any of the plurality of controlled nodes that receive it (including controlled nodes that are not intended to be recipients that receive the second power level request signal through cross-talk and other types of coupling between channels). In exemplary embodiments, the second power level request signal is received by both the first controlled node and the second controlled node. In other exemplary embodiments, the second power level request signal is received by the first controlled node, but not by the second controlled node. In other exemplary embodiments, the second power level request signal is received by the second controlled node, but not by the first controlled node.

In exemplary embodiments, method 200 proceeds to optional block 220 with communicating both the first power level of the first measurement request signal and the second power level of the second measurement request signal from the at least one of the first controlled node and the second controlled node to the controller in response to the second power level request signal. In exemplary embodiments where both the first controlled node and the second controlled node received the second power level request signal from the controller, the first controlled node communicates its first power level and second power level and the second controlled node communicates its first power level and second power level to the controller. In exemplary embodiments where the first controlled node received the second power level request signal from the controller while the second controlled node did not receive the second power level request signal from the controller, the first controlled node communicates its first power level and second power level to the controller in response to the second power level request signal, while the second controlled node does not. In exemplary embodiments where the second controlled node received the second power level request signal from the controller while the first controlled node did not receive the second power level request signal from the controller, the second controlled node communicates its first power level and second power level to the controller in response to the second power level request signal, while the first controlled node does not.

In exemplary embodiments, at least one of the plurality of controlled nodes resends its set of power levels to the controller in response to the second measurement request signal even though it already sent its set of power levels to the controller in response to the first measurement request signal. In exemplary embodiments where this occurs, the set of power levels sent in response to the first measurement request signal is identical to the set of power levels sent in response to the second measurement request signal because there has not been any update to the power levels performed in response to a measurement request signal between the first power level request signal and the second power level request signal.

Method 200 proceeds to block 222 with receiving a set of power levels from both the first controlled node and the second controlled node at the controller in response to at least one power level request signal. In exemplary embodiments, a set of power levels is received for each controlled node in the plurality of controlled nodes in response to one or more power level request signals. In exemplary embodiments, each set of power levels associated with each of the controlled nodes includes a power level for each of the channel interfaces in the plurality of channel interfaces.

Method 200 proceeds to block 224 with determining whether the first controlled node or the second controlled node is more strongly signal-coupled with the first channel interface based on the first power level and the second power level received from both the first controlled node and the second controlled node in response to the at least one power level request signal. In exemplary embodiments, where at least one of the first power level and the second power level received from the first controlled node and the second controlled node are approximately equivalent for both the first controlled node and the second controlled node such that it is unclear which of the first controlled node or the second controlled node is more strongly signal-coupled with the first channel interface, one of first controlled node and the second controlled node is selected as being more strongly signal-coupled with the first channel interface.

In exemplary embodiments, this same determination is made for all of the channel interfaces and all of the controlled nodes to determine the signal-based topology of the system (even though the physical topology may not align based on the cross-talk and other coupling between the channels). In exemplary embodiments, the determination of which channel interface is signal-coupled to which controlled node based on the sets of power levels received from the controlled nodes is enhanced based on previous determinations about which controlled nodes were most strongly signal-coupled previously. For example, in some implementations a single channel interface will not be identified as signal-coupled with more than one controlled node. Similarly, in some implementations, a single controlled node will not be identified as signal-coupled with more than one channel interface.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a controller configured to provide signals to a plurality of controlled nodes, the controller comprising: a plurality of channel interfaces including: a first channel interface configured to be communicatively coupled to a first controlled node of the plurality of controlled nodes; and a second channel interface configured to be communicatively coupled to a second controlled node of the plurality of controlled nodes; wherein the controller is configured to perform discovery of which channel interface of the controller is coupled to which controlled node of the plurality of controlled nodes by being configured to: communicate a first measurement request signal from the first channel interface toward the first controlled node of a plurality of controlled nodes; communicate a second measurement request signal from the second channel interface toward the second controlled node of the plurality of controlled nodes; communicate at least one power level request signal from at least one channel interface of the plurality of channel interfaces of the controller to at least one of the first controlled node and the second controlled node; receive a set of power levels from both the first controlled node and the second controlled node at the controller in response to the at least one power level request signal; determine that the first controlled node is more strongly signal-coupled with the first channel interface than the second controlled node when the first power level received from the first controlled node is higher than the first power level received from the second controlled node; and determine that the second controlled node is more strongly signal-coupled with the first channel interface than the first controlled node when the first power level received from the second controlled node is higher than the first power level received from the second controlled node.

Example 2 includes the controller of Example 1, further configured to: communicate a clear channel power reading signal from the plurality of channel interfaces toward the plurality of controlled nodes.

Example 3 includes the controller of Example 2, wherein the plurality of controlled nodes are configured to: clear channel power readings stored at the plurality of controlled nodes in response to the clear channel power reading signal.

Example 4 includes the controller of any of Examples 2-3, further configured to: communicate the clear channel power reading signal from each of the plurality of channel interfaces toward the plurality of controlled nodes sequentially.

Example 5 includes the controller of any of Examples 1-4, wherein the plurality of controlled nodes are configured to: measure a first power level of the first measurement request signal when receiving the first measurement request signal; and measure a second power level of the second measurement request signal when receiving the second measurement request signal.

Example 6 includes the controller of any of Examples 1-5, wherein the plurality of controlled nodes are configured to: communicate the set of power levels including any measured power levels for each of the plurality of channel interfaces to the controller in response to any power level request signal.

Example 7 includes the controller of any of Examples 1-6, further configured to: communicate a first channel interface assignment to the first controlled node indicating that the first controlled node is assigned to the first channel interface; and communicate a second channel interface assignment to the second controlled node indicating that the second controlled node is assigned to the second channel interface.

Example 8 includes the controller of any of Examples 1-7, wherein the at least one of the plurality of channel interfaces is communicatively coupled to at least one of the plurality of controlled nodes through at least one channel provided over at least one cabled media.

Example 9 includes the controller of Example 8, wherein the at least one cabled media is at least one of category cable, coaxial cable, optical fiber, and twisted pair.

Example 10 includes the controller of any of Examples 8-9, wherein the at least one of the plurality of channel interfaces is communicatively coupled to at least one of the plurality of controlled nodes through at least one wireless channel.

Example 11 includes the controller of any of Examples 1-10, wherein the controller is a host unit in a distributed antenna system; and wherein the plurality of controlled nodes are remote units in the distributed antenna system.

Example 12 includes a method for discovering which channel interface of a controller is signal-coupled to which controlled node controlled by the controller, the method comprising: communicating a first measurement request signal from a first channel interface of a plurality of channel interfaces of a controller to a first controlled node of a plurality of controlled nodes; communicating a second measurement request signal from a second channel interface of the plurality of channel interfaces of the controller to a second controlled node of the plurality of controlled nodes; communicating a first power level request signal from the first channel interface to at least one of the first controlled node and the second controlled node; receiving a set of power levels from both the first controlled node and the second controlled node at the controller in response to at least one power level request signal; determining whether the first controlled node or the second controlled node is more strongly signal-coupled with the first channel interface based on the first power level and the second power level received from both the first controlled node and the second controlled node in response to the at least one power level request signal.

Example 13 includes the method of Example 12, further comprising: communicating a clear channel power reading signal from the plurality of channel interfaces to the plurality of controlled nodes.

Example 14 includes the method of Example 13, further comprising: clearing channel power readings stored at the plurality of controlled nodes in response to the clear channel power reading signal.

Example 15 includes the method of any of Examples 13-14, wherein communicating the clear channel power reading signals from the plurality of channel interfaces is performed sequentially for each of the channel interfaces.

Example 16 includes the method of any of Examples 12-15, further comprising: measuring a first power level of the first measurement request signal at the first controlled node.

Example 17 includes the method of Example 16, further comprising: measuring a second power level of the second measurement request signal at the second controlled node.

Example 18 includes the method of Example 17, further comprising: communicating the first power level of the first measurement request signal and the second power level of the second measurement request signal from at least one of the first controlled node and the second controlled node to the controller in response to the first power level request signal.

Example 19 includes the method of any of Examples 17-18, further comprising: communicating a second power level request signal from the second channel interface to at least one of the first controlled node and the second controlled node.

Example 20 includes the method of any of Examples 17-19, further comprising: communicating the first power level of the first measurement request signal and the second power level of the second measurement request signal from at least one of the first controlled node and the second controlled node to the controller in response to the second power level request signal.

Example 21 includes the method of any of Examples 12-20, further comprising: communicating a first channel interface assignment to the first controlled node indicating to which channel interface the first controlled node is assigned; and communicating a second channel interface assignment to the second controlled node indicating to which channel interface the second controlled node is assigned.

Example 22 includes the method of any of Examples 12-21, wherein the controller is a host unit in a distributed antenna system; and wherein the plurality of controlled nodes are remote units in the distributed antenna system.

Example 23 includes a system for discovering which channel interface of a controller is signal-coupled to which controlled node controlled by the controller, the system comprising: a plurality of controlled nodes including a first controlled node and a second controlled node; a controller configured to provide signals to the plurality of controlled nodes, the controller having a plurality of channel interfaces including: a first channel interface configured to be communicatively coupled to the first controlled node; and a second channel interface configured to be communicatively coupled to the second controlled node; wherein the controller is configured to perform discovery of which channel interface of the controller is coupled to which controlled node by being configured to: communicate a first measurement request signal from the first channel interface toward the first controlled node; communicate a second measurement request signal from the second channel interface toward the second controlled node; communicate at least one power level request signal from at least one channel interface of the plurality of channel interfaces of the controller to at least one of the first controlled node and the second controlled node; receive a set of power levels from both the first controlled node and the second controlled node at the controller in response to the at least one power level request signal; determine that the first controlled node is more strongly signal-coupled with the first channel interface than the second controlled node when the first power level received from the first controlled node is higher than the first power level received from the second controlled node; determine that the second controlled node is more strongly signal-coupled with the first channel interface than the first controlled node when the first power level received from the second controlled node is higher than the first power level received from the second controlled node.

Example 24 includes the system of Example 23, wherein the controller is further configured to: communicate a clear channel power reading signal from the plurality of channel interfaces toward the plurality of controlled nodes.

Example 25 includes the system of Example 24, wherein the plurality of controlled nodes are configured to: clear channel power readings stored at the plurality of controlled nodes in response to the clear channel power reading signal.

Example 26 includes the system of any of Examples 24-25, wherein the controller is configured to: communicate the clear channel power reading signal from each of the plurality of channel interfaces toward the plurality of controlled nodes sequentially.

Example 27 includes the system of any of Examples 23-26, wherein the plurality of controlled nodes are configured to: measure a first power level of the first measurement request signal when receiving the first measurement request signal; and measure a second power level of the second measurement request signal when receiving the second measurement request signal.

Example 28 includes the system of any of Examples 23-27, wherein the plurality of controlled nodes are further configured to: communicate the set of power levels including any measured power levels for each of the plurality of channel interfaces to the controller in response to any power level request signal.

Example 29 includes the system of any of Examples 23-28, wherein the controller is further configured to: communicate a first channel interface assignment to the first controlled node indicating that the first controlled node is assigned to the first channel interface; and communicate a second channel interface assignment to the second controlled node indicating that the second controlled node is assigned to the second channel interface.

Example 30 includes the system of any of Examples 23-29, wherein the at least one of the plurality of channel interfaces is communicatively coupled to at least one of the plurality of controlled nodes through at least one channel provided over at least one cabled media.

Example 31 includes the system of any of Examples 23-30, wherein the at least one cabled media is at least one of category cable, coaxial cable, optical fiber, and twisted pair.

Example 32 includes the system of any of Examples 23-31, wherein the at least one of the plurality of channel interfaces is communicatively coupled to at least one of the plurality of controlled nodes through at least one wireless channel.

Example 33 includes the system of any of Examples 23-32, wherein the system is a distributed antenna system; wherein the controller is a host unit in the distributed antenna system; and wherein the plurality of controlled nodes are remote units in the distributed antenna system.

What is claimed is:

1. A controller configured to provide signals to a plurality of controlled nodes, the controller comprising:
   a plurality of channel interfaces including:
      a first channel interface configured to be communicatively coupled to a first controlled node of the plurality of controlled nodes; and
      a second channel interface configured to be communicatively coupled to a second controlled node of the plurality of controlled nodes;
   wherein the controller is configured to perform discovery of which channel interface of the controller is coupled to which controlled node of the plurality of controlled nodes by being configured to:
      communicate a first measurement request signal from the first channel interface toward the first controlled node of a plurality of controlled nodes, wherein each of the plurality of controlled nodes is configured to measure a first power level of the first measurement request signal when receiving the first measurement request signal;
      communicate a second measurement request signal from the second channel interface toward the second controlled node of the plurality of controlled nodes, wherein each of the plurality of controlled nodes is configured to measure a second power level of the second measurement request signal when receiving the second measurement request signal;
      communicate at least one power level request signal from at least one channel interface of the plurality of channel interfaces of the controller to at least one of the first controlled node or the second controlled node, wherein each of the plurality of controlled nodes are configured to communicate a respective set of power levels including any measured power levels for each of the plurality of channel interfaces to the controller in response to any power level request signal;

receive a first set of power levels from the first controlled node and a second set of power levels from the second controlled node at the controller in response to the at least one power level request signal, wherein each of the first set of power levels and the second set of power levels includes a first power level of the first measurement request signal and a second power level of the second measurement request signal;

when the first power level received from the first controlled node is higher than the first power level received from the second controlled node, determine that the first controlled node is more strongly signal-coupled with the first channel interface than the second controlled node; and when the first power level received from the second controlled node is higher than the first power level received from the first controlled node, determine that the second controlled node is more strongly signal-coupled with the first channel interface than the first controlled node.

2. The controller of claim 1, further configured to:
communicate a clear channel power reading signal from the plurality of channel interfaces toward the plurality of controlled nodes.

3. The controller of claim 2, wherein the plurality of controlled nodes are configured to:
clear channel power readings stored at the plurality of controlled nodes in response to the clear channel power reading signal.

4. The controller of claim 2, further configured to:
communicate the clear channel power reading signal from each of the plurality of channel interfaces toward the plurality of controlled nodes sequentially.

5. The controller of claim 1, wherein the plurality of controlled nodes are configured to:
communicate a respective set of power levels including any measured power levels for each of the plurality of channel interfaces to the controller in response to any power level request signal.

6. The controller of claim 1, further configured to:
communicate a first channel interface assignment to the first controlled node indicating that the first controlled node is assigned to the first channel interface; and
communicate a second channel interface assignment to the second controlled node indicating that the second controlled node is assigned to the second channel interface.

7. The controller of claim 1, wherein the at least one of the plurality of channel interfaces is communicatively coupled to at least one of the plurality of controlled nodes through at least one channel provided over at least one cabled media.

8. The controller of claim 7, wherein the at least one cabled media is at least one of category cable, coaxial cable, optical fiber, or twisted pair.

9. The controller of claim 7, wherein the at least one of the plurality of channel interfaces is communicatively coupled to at least one of the plurality of controlled nodes through at least one wireless channel.

10. The controller of claim 1, wherein the controller is a host unit in a distributed antenna system; and
wherein the plurality of controlled nodes are remote units in the distributed antenna system.

11. A method for discovering which channel interface of a controller is signal-coupled to which controlled node controlled by the controller, the method comprising:
communicating a first measurement request signal from a first channel interface of a plurality of channel interfaces of a controller to a first controlled node of a plurality of controlled nodes;
when each respective controlled node of the plurality of controlled nodes receives the first measurement request signal, measuring a first power level of the first measurement request signal at the respective controlled node;
communicating a second measurement request signal from a second channel interface of the plurality of channel interfaces of the controller to a second controlled node of the plurality of controlled nodes;
when each respective controlled node of the plurality of controlled nodes receives the second measurement request signal, measuring a second power level of the second measurement request signal at the respective controlled node;
communicating a first power level request signal from the first channel interface to at least one of the first controlled node or the second controlled node, wherein each of the plurality of controlled nodes are configured to communicate a respective set of power levels including any measured power levels for each of the plurality of channel interfaces to the controller in response to any power level request signal;
when each respective controlled node of the plurality of controlled nodes receives any power level request signal, communicating a respective set of power levels including any measured power levels for each of the plurality of channel interfaces from the respective controlled node to the controller;
receiving a first set of power levels from the first controlled node and a second set of power levels from the second controlled node at the controller in response to at least one power level request signal, wherein each of the first set of power levels and the second set of power levels includes a first power level of the first measurement request signal and a second power level of the second measurement request signal;
determining whether the first controlled node or the second controlled node is more strongly signal-coupled with the first channel interface based on the first power level of the first set of power levels received from the first controlled node and the first power level of the first set of power levels received from the second controlled node in response to the at least one power level request signal.

12. The method of claim 11, further comprising:
communicating a clear channel power reading signal from the plurality of channel interfaces to the plurality of controlled nodes.

13. The method of claim 12, further comprising:
clearing channel power readings stored at the plurality of controlled nodes in response to the clear channel power reading signal.

14. The method of claim 12, wherein communicating the clear channel power reading signals from the plurality of channel interfaces is performed sequentially for each of the channel interfaces.

15. The method of claim 11, further comprising:
   measuring a first power level of the first measurement request signal at the first controlled node.
16. The method of claim 15, further comprising:
   measuring a second power level of the second measurement request signal at the second controlled node.
17. The method of claim 16, further comprising:
   communicating the first power level of the first measurement request signal and the second power level of the second measurement request signal from at least one of the first controlled node or the second controlled node to the controller in response to the first power level request signal.
18. The method of claim 16, further comprising:
   communicating a second power level request signal from the second channel interface to at least one of the first controlled node or the second controlled node.
19. The method of claim 16, further comprising:
   communicating the first power level of the first measurement request signal and the second power level of the second measurement request signal from at least one of the first controlled node or the second controlled node to the controller in response to the second power level request signal.
20. The method of claim 11, further comprising:
   communicating a first channel interface assignment to the first controlled node indicating to which channel interface the first controlled node is assigned; and
   communicating a second channel interface assignment to the second controlled node indicating to which channel interface the second controlled node is assigned.
21. The method of claim 11, wherein the controller is a host unit in a distributed antenna system; and
   wherein the plurality of controlled nodes are remote units in the distributed antenna system.
22. A system for discovering which channel interface of a controller is signal-coupled to which controlled node controlled by the controller, the system comprising:
   a plurality of controlled nodes including a first controlled node and a second controlled node;
   a controller configured to provide signals to the plurality of controlled nodes, the controller having a plurality of channel interfaces including:
      a first channel interface configured to be communicatively coupled to the first controlled node; and
      a second channel interface configured to be communicatively coupled to the second controlled node;
   wherein the controller is configured to perform discovery of which channel interface of the controller is coupled to which controlled node by being configured to:
      communicate a first measurement request signal from the first channel interface toward the first controlled node, wherein each of the plurality of controlled nodes is configured to measure a first power level of the first measurement request signal when receiving the first measurement request signal;
      communicate a second measurement request signal from the second channel interface toward the second controlled node, wherein each of the plurality of controlled nodes is configured to measure a second power level of the second measurement request signal when receiving the second measurement request signal;
      communicate at least one power level request signal from at least one channel interface of the plurality of channel interfaces of the controller to at least one of the first controlled node or the second controlled node, wherein each of the plurality of controlled nodes are configured to communicate a respective set of power levels including any measured power levels for each of the plurality of channel interfaces to the controller in response to any power level request signal;
      receive a first set of power levels from the first controlled node and a second set of power levels from the second controlled node at the controller in response to the at least one power level request signal, wherein each of the first set of power levels and the second set of power levels includes a first power level of the first measurement request signal and a second power level of the second measurement request signal;
      when the first power level received from the first controlled node is higher than the first power level received from the second controlled node, determine that the first controlled node is more strongly signal-coupled with the first channel interface than the second controlled node;
      when the first power level received from the second controlled node is higher than the first power level received from the first controlled node, determine that the second controlled node is more strongly signal-coupled with the first channel interface than the first controlled node.
23. The system of claim 22, wherein the controller is further configured to:
   communicate a clear channel power reading signal from the plurality of channel interfaces toward the plurality of controlled nodes.
24. The system of claim 23, wherein the plurality of controlled nodes are configured to:
   clear channel power readings stored at the plurality of controlled nodes in response to the clear channel power reading signal.
25. The system of claim 23, wherein the controller is configured to:
   communicate the clear channel power reading signal from each of the plurality of channel interfaces toward the plurality of controlled nodes sequentially.
26. The system of claim 22, wherein the plurality of controlled nodes are further configured to:
   communicate the set of power levels including any measured power levels for each of the plurality of channel interfaces to the controller in response to any power level request signal.
27. The system of claim 22, wherein the controller is further configured to:
   communicate a first channel interface assignment to the first controlled node indicating that the first controlled node is assigned to the first channel interface; and
   communicate a second channel interface assignment to the second controlled node indicating that the second controlled node is assigned to the second channel interface.
28. The system of claim 22, wherein the at least one of the plurality of channel interfaces is communicatively coupled to at least one of the plurality of controlled nodes through at least one channel provided over at least one cabled media.
29. The system of claim 22, wherein the at least one cabled media is at least one of category cable, coaxial cable, optical fiber, or twisted pair.

30. The system of claim 22, wherein the at least one of the plurality of channel interfaces is communicatively coupled to at least one of the plurality of controlled nodes through at least one wireless channel.

31. The system of claim 22, wherein the system is a distributed antenna system;
   wherein the controller is a host unit in the distributed antenna system; and
   wherein the plurality of controlled nodes are remote units in the distributed antenna system.

* * * * *